United States Patent
Kawamura

(10) Patent No.: US 10,311,595 B2
(45) Date of Patent: Jun. 4, 2019

(54) IMAGE PROCESSING DEVICE AND ITS CONTROL METHOD, IMAGING APPARATUS, AND STORAGE MEDIUM

(71) Applicant: CANON KABUSHIKI KAISHA, Tokyo (JP)

(72) Inventor: Yuta Kawamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 670 days.

(21) Appl. No.: 14/541,700

(22) Filed: Nov. 14, 2014

(65) Prior Publication Data

US 2015/0138322 A1 May 21, 2015

(30) Foreign Application Priority Data

Nov. 19, 2013 (JP) ................. 2013-238880
Nov. 19, 2013 (JP) ................. 2013-238881
Mar. 3, 2014 (JP) ................. 2014-040522

(51) Int. Cl.
  *G06T 7/73* (2017.01)

(52) U.S. Cl.
  CPC ...... *G06T 7/73* (2017.01); *G06T 2207/10016* (2013.01); *G06T 2207/10028* (2013.01); *G06T 2207/30244* (2013.01)

(58) Field of Classification Search
  CPC .............. G01C 21/005; G01C 21/3647; G06T 2207/30252; G06T 19/006; G06T 2207/30244; G06T 2207/10032; G06T 7/004; G06T 7/0044; G06T 7/0046; G06T 11/60; G06T 19/20; G06T 2219/2004; G06T 7/20; G06T 17/05; G06T 1/0014;
(Continued)

(56) References Cited

U.S. PATENT DOCUMENTS 5,422,828 A * 6/1995 Choate ................. G01S 11/12
  342/458
5,530,420 A   6/1996 Tsuchiya et al.
(Continued)

FOREIGN PATENT DOCUMENTS

JP  H07192199 A  7/1995
JP  H11-112871 A  4/1999
(Continued)

OTHER PUBLICATIONS

Triggs, "Autocalibration from Planar Scene", European Conference on Computer Vision, Dec. 2010, pp. 1-14.
(Continued)

*Primary Examiner* — Mohammed S Rahaman
*Assistant Examiner* — Samuel D Fereja
(74) *Attorney, Agent, or Firm* — Carter, DeLuca & Farrell LLP

(57) ABSTRACT

An image processing device includes an acquisition unit configured to acquire an image data and a depth data correspond to the image data; a calculating unit configured to calculate a position and attitude change for each depth from the image data and the depth data; and a determining unit configured to determine a position and attitude change of a whole image by a position and attitude change data calculated by the calculating unit based on a statistic of the position and attitude change calculated by the calculating unit.

26 Claims, 23 Drawing Sheets

(58) Field of Classification Search
CPC . G06T 2207/10012; G06T 2207/10028; G06T 7/0042; G06T 2207/10016; G06T 2207/30241; G06T 7/0018; G06T 7/002; G06T 7/0051; G06T 17/10; G06T 2207/10004; G06T 2207/30168; G06T 2207/30204; G06T 7/00; G06T 7/0002; G06T 7/0026; G06T 7/003

See application file for complete search history.

(56) References Cited

U.S. PATENT DOCUMENTS

| | | | |
|---|---|---|---|
| 6,819,436 B2 | 11/2004 | Ono | |
| 8,577,176 B2 | 11/2013 | Kotake et al. | |
| 8,908,913 B2* | 12/2014 | Taguchi | G06T 7/521 382/103 |
| 9,088,772 B2 | 7/2015 | Koizumi | |
| 9,089,971 B2* | 7/2015 | Aoba | B25J 9/1697 |
| 9,196,045 B2 | 11/2015 | Gurman et al. | |
| 2003/0035098 A1* | 2/2003 | Ishiyama | G06K 9/00234 356/72 |
| 2008/0172201 A1* | 7/2008 | Kotake | G01C 11/00 702/150 |
| 2008/0266416 A1* | 10/2008 | Kobayashi | H04N 5/2224 348/222.1 |
| 2009/0263009 A1* | 10/2009 | Krishnaswamy | G05D 1/0253 382/154 |
| 2010/0073366 A1 | 3/2010 | Tateno | |
| 2011/0206124 A1* | 8/2011 | Morphet | H04N 5/145 375/240.16 |
| 2011/0206236 A1* | 8/2011 | Center, Jr. | G06T 7/269 382/103 |
| 2011/0261160 A1* | 10/2011 | Tadokoro | H04N 13/0011 348/46 |
| 2012/0076361 A1* | 3/2012 | Fujiyoshi | G01S 17/89 382/103 |
| 2012/0121135 A1* | 5/2012 | Kotake | G01S 5/163 382/103 |
| 2012/0121161 A1* | 5/2012 | Eade | G09B 29/007 382/153 |
| 2012/0230235 A1* | 9/2012 | Perras | H04L 69/14 370/310 |
| 2013/0230235 A1 | 9/2013 | Tateno et al. | |
| 2014/0055560 A1* | 2/2014 | Fu | H04N 13/0022 348/42 |
| 2014/0118494 A1* | 5/2014 | Wu | G06T 7/20 348/44 |
| 2014/0348238 A1* | 11/2014 | Morphet | H04N 5/145 375/240.16 |
| 2015/0049169 A1* | 2/2015 | Krig | G06T 7/593 348/46 |
| 2015/0145889 A1* | 5/2015 | Hanai | H04N 5/2621 345/633 |
| 2015/0201132 A1* | 7/2015 | Onai | G06T 13/80 345/419 |
| 2015/0227779 A1* | 8/2015 | Kawai | H04N 13/0018 382/154 |
| 2015/0235380 A1* | 8/2015 | Hayashi | G06T 7/2086 382/103 |
| 2015/0304630 A1* | 10/2015 | Wu | G06T 7/20 348/44 |
| 2016/0154408 A1* | 6/2016 | Eade | G09B 29/007 701/523 |

FOREIGN PATENT DOCUMENTS

| | | | | |
|---|---|---|---|---|
| JP | 2001356004 A | | 12/2001 | |
| JP | 2004-171189 A | | 6/2004 | |
| JP | 2007-243660 A | | 9/2007 | |
| JP | 2010-038907 A | | 2/2010 | |
| JP | 2010-079453 A | | 4/2010 | |
| JP | 2011-027623 A | | 2/2011 | |
| JP | 2011-174878 A | | 9/2011 | |
| JP | 2011-253521 A | | 12/2011 | |
| JP | WO 2012066769 A1 * | | 5/2012 | G06T 7/0046 |
| JP | 2012-123781 A | | 6/2012 | |
| JP | 2012-222743 A | | 11/2012 | |
| JP | 2013-036987 A | | 2/2013 | |
| WO | 2012/093147 A1 | | 7/2012 | |

OTHER PUBLICATIONS

Hartley et al., "Multiple View Geometry in Computer Vision", Cambridge University Press, 2004, pp. 1-674.

Triggs, "Routines for Relative Pose of Two Calibrated Cameras from 5 Points", Dec. 2010, pp. 1-14.

Titterton et al., "Strapdown Inertial Navigation Technology", The Institution of Electrical Engineers, 2004, pp. 1-594.

Japanese Office Action dated Oct. 24, 2017 in corresponding Japanese Patent Application No. 2013-238881 together with English translation, 7 pages.

Japanese Office Action dated Dec. 26, 2017 in corresponding Japanese Patent Application No. 2014040522 with English translation.

Japanese Office Action dated Jul. 10, 2018 and issued in corresponding Japanese Patent Application No. 2014-040522 together with English translation.

* cited by examiner

IMAGE PROCESSING DEVICE AND ITS CONTROL METHOD, IMAGING APPARATUS, AND STORAGE MEDIUM

BACKGROUND OF THE INVENTION

Field of the Invention

The present invention relates to an image processing technique that estimates a change in position and attitude relationship between an imaging apparatus and an object to be captured by utilizing a captured image and a depth image captured in synchronization with the captured image.

Description of the Related Art

There are techniques for estimating the position and attitude of an object to be captured, the relative position or attitude between an imaging apparatus and the object to be captured, or the change over time thereof based on an image captured by the imaging apparatus. As an implementation method, an estimation method using motion information about a motion vector or a corresponding point image is typically employed. In recent years, with the advancement of a depth data acquiring technique, there has been proposed a method for establishing a three-dimensional model of an object to be captured from depth data and collating the three-dimensional model with the previously prepared three-dimensional model so as to estimate a positional relationship. There has also been proposed a method for using information obtained from an image together with the depth data.

Japanese Patent Laid-Open No. 2011-27623 and Japanese Patent Laid-Open No. 2012-123781 disclose a method for using depth data together with the feature of an image. In the method disclosed in Japanese Patent Laid-Open No. 2011-27623, alignment between the previously prepared three-dimensional shape model and depth data is used together with alignment between the two-dimensional feature extracted from an image and the projection feature obtained when the three-dimensional shape model is projected onto a two-dimensional image at a certain position and attitude. This allows estimating the position and attitude of an object. In the method disclosed in Japanese Patent Laid-Open No. 2012-123781, depth data at the position of the feature point detected from an image is associated with the previously prepared three-dimensional shape model, so that the position and attitude of an object can be estimated by dealing with an erroneous handling caused by a noise of depth data.

As a method for calculating a region of interest which is used for calculating a position and attitude change, a background region is often calculated. In the conventional background region extraction, a method for specifying a background and a moving object using a difference between continuous frames is typically employed. In the method disclosed in Japanese Patent Laid-Open No. H11-112871, differences between images constituting one scene from a moving image are compared, so that a foreground region and a background region are specified and separated from each other, which are then used for image processing.

When the camera work of an imaging apparatus is estimated based on an image captured by the imaging apparatus, there are two methods: a method for estimating the position and attitude of an object based on a motion vector and a method for estimating the position and attitude of an object based on depth data. In these two discrete methods, if a dynamic region and a static region are mixed in a captured image, it may become difficult to estimate the change over time of position and attitude and the camera work represented by the position and attitude which is the integration thereof.

SUMMARY OF THE INVENTION

The present invention provides an image processing device that detects the position and attitude of an object using image data and depth data so as to enhance the position and attitude estimation accuracy while suppressing the influence of motion of a dynamic region when the dynamic region and the static region are mixed in an image.

According to an aspect of the present invention, an image processing device is provided that includes an acquisition unit configured to acquire an image data and a depth data correspond to the image data; a calculating unit configured to calculate a position and attitude change for each depth from the image data and the depth data; and a determining unit configured to determine a position and attitude change of a whole image by a position and attitude change data calculated by the calculating unit based on a statistic of the position and attitude change calculated by the calculating unit.

Further features of the present invention will become apparent from the following description of exemplary embodiments with reference to the attached drawings.

DESCRIPTION OF THE EMBODIMENTS

A description will be given of an imaging apparatus including an image processing device according to embodiments of the present invention with reference to the attached drawings. It is assumed that the imaging apparatus has a function that suppresses image shake caused by shaking of hands, shaking of the body, or the like of a photographer under control of a known image shake correction.

First Embodiment

Figure 1:
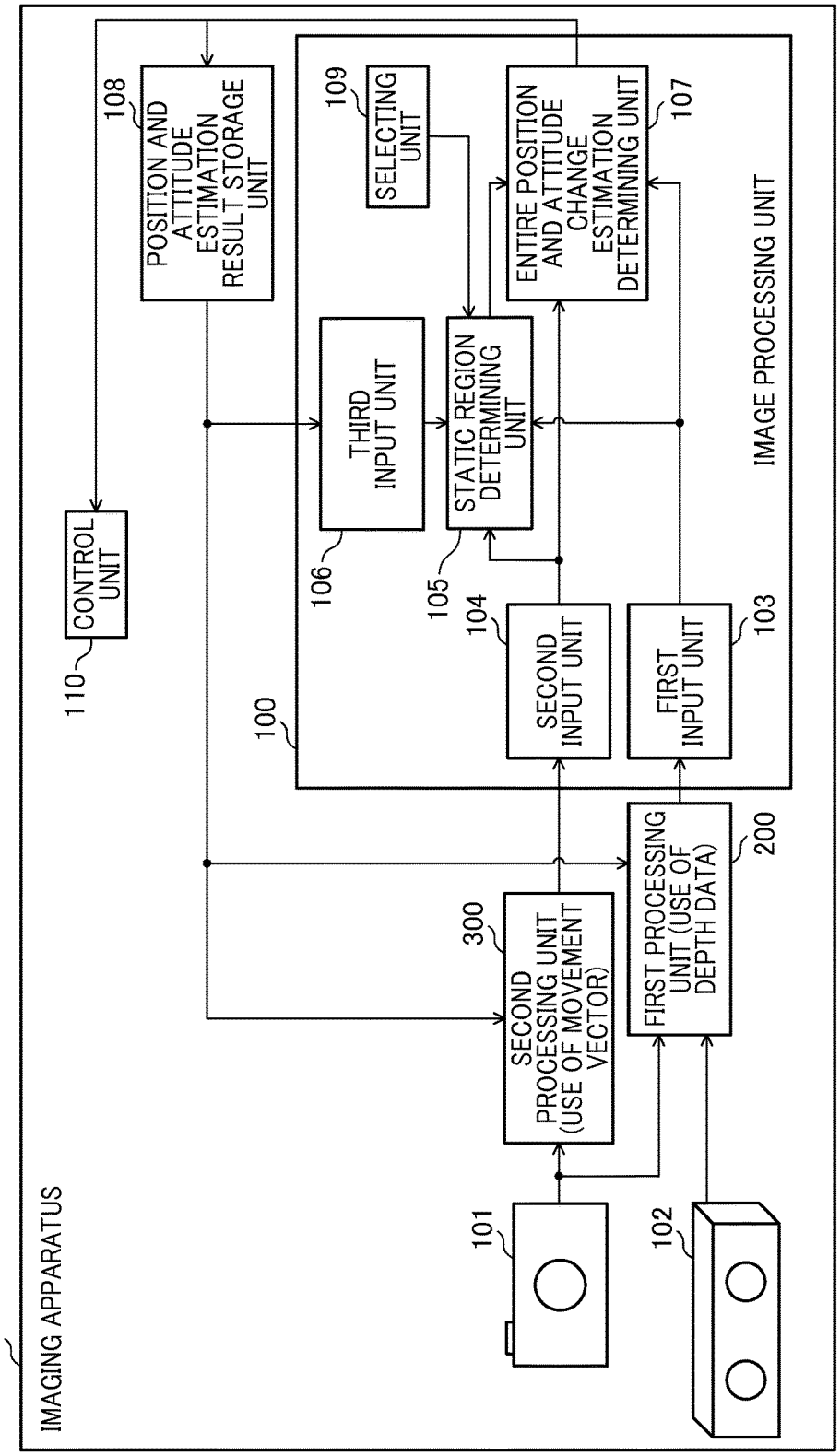
FIG. 1 is a block diagram illustrating an entire configuration of an apparatus in order to explain a first embodiment of the present invention in conjunction with FIGS. 2 to 13.

FIG. 1 is a block diagram illustrating an example of a configuration of an imaging apparatus according to a first embodiment of the present invention. An imaging apparatus 1 includes an image acquiring device 101, a depth image acquiring device 102, a first processing unit 200, a second processing unit 300, an image processing unit 100, a position and attitude estimation result storage unit (hereinafter simply referred to as "storage unit") 108, and a control unit 110.

The image acquiring device 101 is a unit configured to acquire two-dimensional image data by capturing an object. Image data obtained by the image acquiring device 101 is output to the first processing unit 200 and the second processing unit 300. In the present embodiment, the first processing unit 200 configured to use depth data and the second processing unit 300 configured to use a motion vector are employed.

The depth image acquiring device 102 is a device that detects depth data and is connected to the first processing unit 200. In the present embodiment, a description will be given of depth data as, for example, a depth image having depth data for each pixel. The depth image acquiring device 102 has, for example, an infrared ray irradiating unit and an infrared ray reading unit. The infrared ray irradiating unit irradiates an object with an infrared ray of the predetermined pattern, and the infrared ray reading unit reads the infrared ray reflected from the object. In this manner, a depth image is captured by reading the distortion of the pattern. Note that a depth image may also be generated by other methods. For example, a Time of flight method for capturing a depth image by measuring a time taken for read out after irradiation of an infrared ray or a method for generating a depth image by determining parallax of a plurality of images captured by a multi-eye lens may also be employed. Any method may be employed as long as a depth image can be generated thereby.

The first processing unit 200 acquires image data obtained from the image acquiring device 101 and depth image data obtained from the depth image acquiring device 102 to estimate a position and attitude change. At this time, the first processing unit 200 may also acquire the estimation result of the past position and attitude change from the storage unit 108 and then use it for estimation of a position and attitude change. The first processing unit 200 outputs the estimation result of the position and attitude change with use of depth data to the image processing unit 100.

The second processing unit 300 detects a motion vector using image data captured by the image acquiring device 101 to estimate a position and attitude change. At this time, the second processing unit 300 may also acquire the estimation result of the past position and attitude change from the storage unit 108 and then use it for estimation of an attitude change. The second processing unit 300 outputs the estimation result of the position and attitude change with use of a motion vector to the image processing unit 100.

The image processing unit 100 includes a first input unit 103 and a second input unit 104 to which the estimation result of the position and attitude change is input, a static region determining unit 105, a third input unit 106 relating to the estimation result of the past position and attitude change, and an entire position and attitude change estimation determining unit 107.

The first input unit 103 to which the estimation result of the position and attitude change with use of depth data is input is connected to the first processing unit 200. A first position and attitude change computation result (hereinafter referred to as "first computation result") which has been estimated by the first processing unit 200 using depth data is output from the first input unit 103 to the static region determining unit 105 and the estimation determining unit 107.

The second input unit 104 to which the estimation result of the position and attitude change with use of a motion vector is input is connected to the second processing unit 300. A second position and attitude change computation result (hereinafter referred to as "second computation result") which has been estimated by the second processing unit 300 using a motion vector is output from the second input unit 104 to the static region determining unit 105 and the estimation determining unit 107.

The static region determining unit 105 acquires the first computation result and the second computation result, and executes first determination processing for determining a static region in an image based on these pieces of information. At this time, the static region determining unit 105 may also acquire the past position and attitude change computation result (hereinafter referred to as "past computation result") from the storage unit 108 via the third input unit 106 to use it for determining a static region. Information about the static region determined by the first determination processing is output to the estimation determining unit 107. The static region determining unit 105 may also determine a static region in accordance with the judgment criteria selected by a selecting unit 109. The selecting unit 109 includes an operation unit for selecting the judgment criteria for a static region depending on a user operation and a display unit such as a setting screen or the like.

The estimation determining unit 107 executes second determination processing for determining a position and attitude change of the whole image using the first computation result and the second computation result and information about the static region determined by the static region determining unit 105. The position and attitude change computation result determined by the second determination processing is sent to the storage unit 108 for storage. The storage unit 108 stores the estimation result of the position and attitude change as the past computation result. The storage unit 108 is connected to the first processing unit 200, the second processing unit 300, and the third input unit 106, and outputs the past computation result to the respective units as needed.

Figure 2:
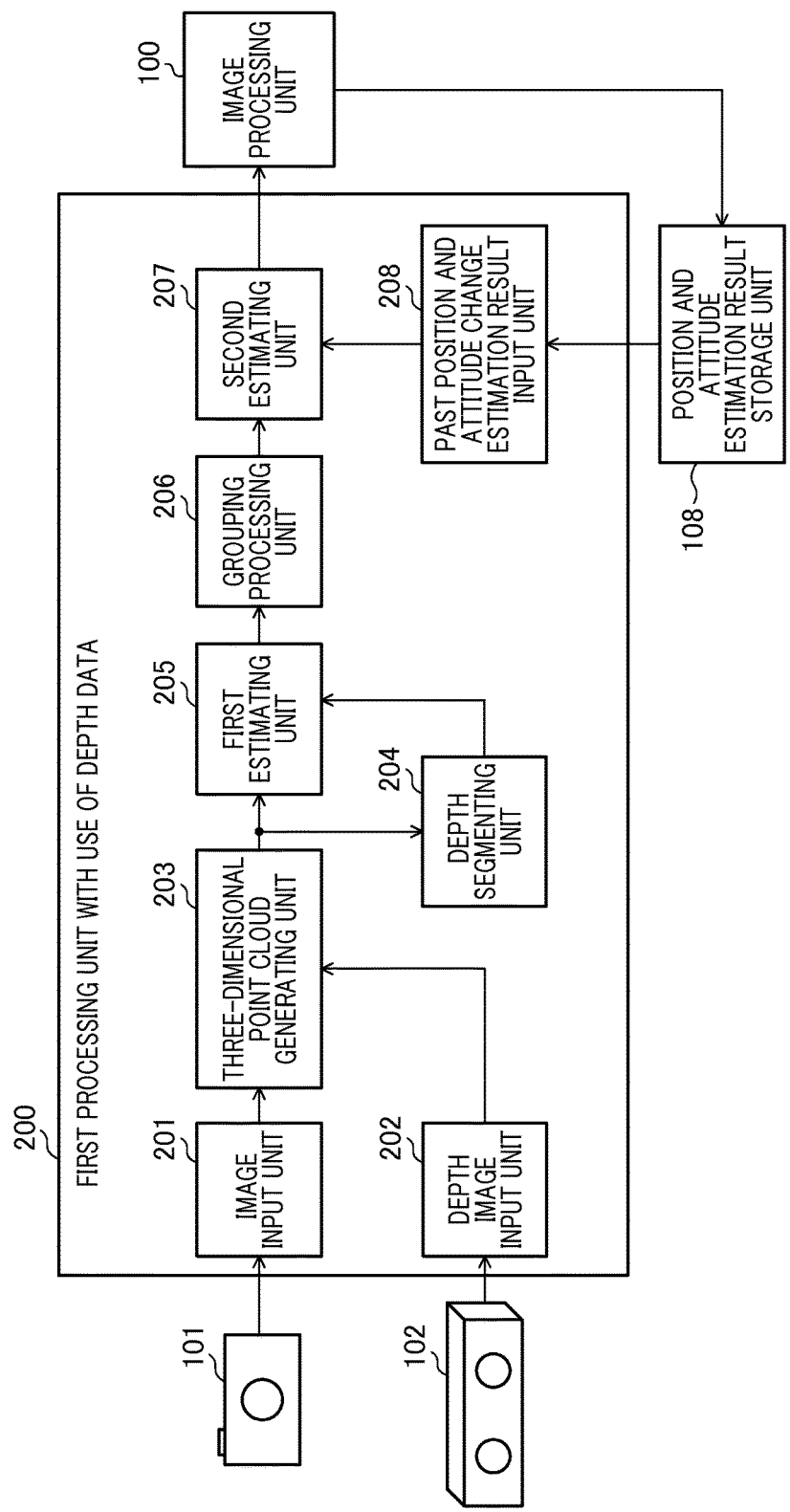
FIG. 2 is a block diagram illustrating a configuration of a depth data processing unit.

Next, a description will be given of a configuration of the first processing unit 200 with reference to the block diagram shown in FIG. 2.

Image data obtained from the image acquiring device 101 is input to an image input unit 201, and depth image data obtained from the depth image acquiring device 102 is input to a depth image input unit 202. A three-dimensional point cloud generating unit 203 acquires image data and depth image data from the image input unit 201 and the depth image input unit 202, respectively, to generate a three-dimensional point cloud to be described below. The three-dimensional point cloud data is output to a depth segmenting unit 204 and a first estimating unit 205.

The depth segmenting unit 204 performs segmentation processing for segmenting the three-dimensional point cloud generated by the three-dimensional point cloud generating unit 203 for each depth using the depth image input from the depth image input unit 202. The processing result is output to the first estimating unit 205. The first estimating unit 205 executes processing for estimating a position and attitude change for each depth. At this time, the first estimating unit 205 sets the three-dimensional point cloud generated by the three-dimensional point cloud generating unit 203 as a non-reference frame and sets the three-dimensional point cloud having depth data segmented by the depth segmenting unit 204 as a reference frame. The first estimating unit 205 estimates a position and attitude change in non-reference frame for each of the segmented depths, and then outputs the estimation result to a grouping processing unit 206.

The grouping processing unit 206 executes processing for grouping the estimation result of the position and attitude change for each depth estimated by the first estimating unit 205. A second estimating unit 207 executes processing for estimating the entire position and attitude change. The second estimating unit 207 selects one of the estimation result of the position and attitude changes of the groups grouped by the grouping processing unit 206, and sets the selected one as the first computation result. In other words, the second estimating unit 207 is connected to the image processing unit 100, and the first computation result is transmitted to the first input unit 103 (see FIG. 1). An input unit 208 to which the past computation result is input is connected to the storage unit 108 and the past computation result is output to the second estimating unit 207 via the input unit 208.

Figure 3:
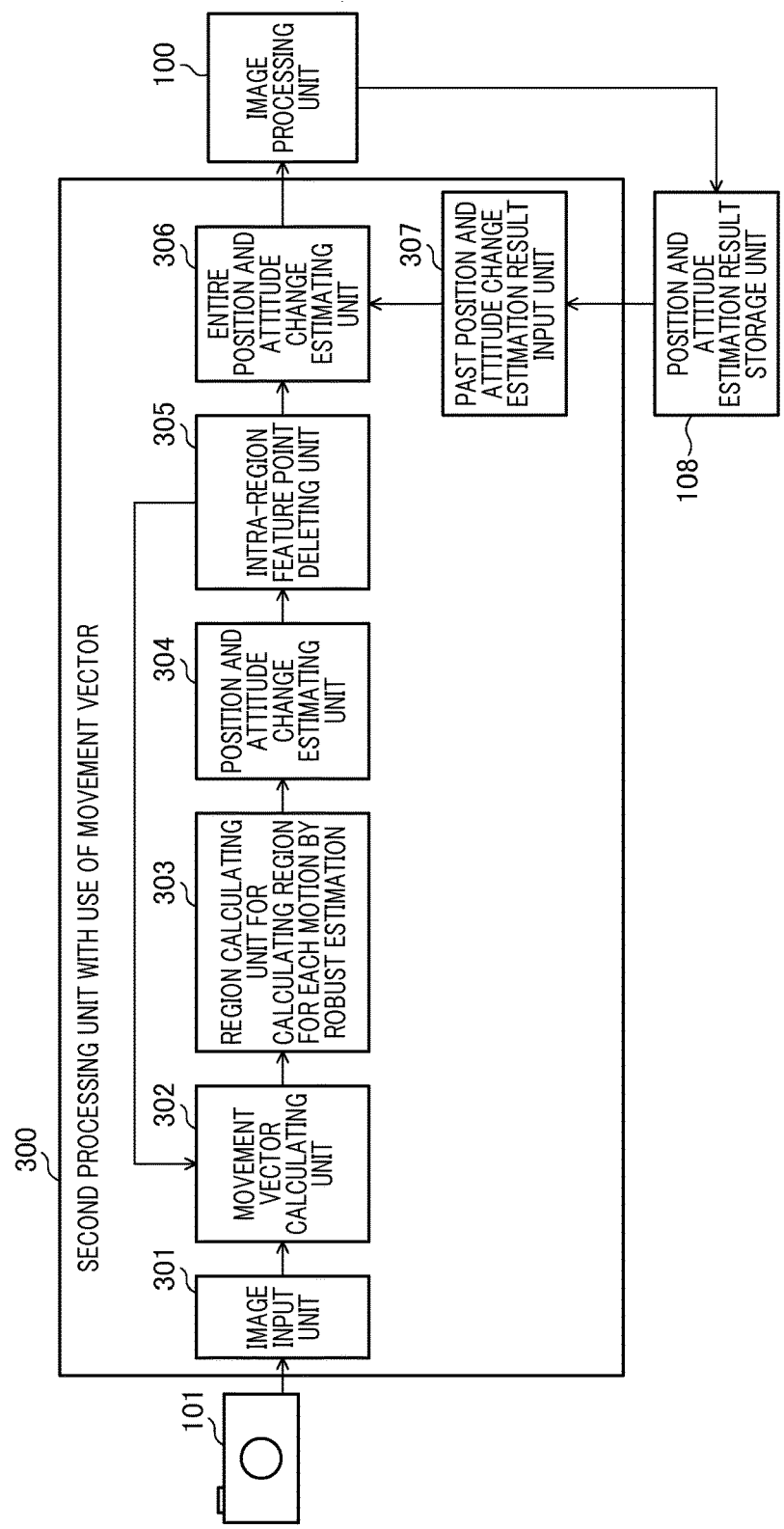
FIG. 3 is a block diagram illustrating a configuration of a motion vector processing unit.

Next, a description will be given of a configuration of the second processing unit 300 with use of a motion vector with reference to FIG. 3.

An image input unit 301 is connected to the image acquiring device 101. Image data captured by the image acquiring device 101 is input to the image input unit 301. A motion vector calculating unit 302 calculates a motion vector between images by comparing reference frame image data and non-reference frame image data, both of which are input from the image input unit 301, and outputs the motion vector to a region calculating unit 303. The region calculating unit 303 calculates the motion vector in a region for each motion using information about the motion vector calculated by the motion vector calculating unit 302 by robust estimation. A position and attitude change estimating unit 304 estimates a position and attitude change by acquiring the motion vector for each region calculated by the region calculating unit 303 and then outputs the estimation result to a deleting unit 305 configured to delete a feature point in a region. The deleting unit 305 outputs the processing result obtained by deleting a feature point in the region calculated by the region calculating unit 303 to an estimating unit 306 configured to estimate the entire position and attitude change. The estimating unit 306 selects one of the position and attitude changes in the regions for each motion estimated by the position and attitude change estimating unit 304 and sets the selected one as the second computation result. For example, the position and attitude change of the region of which the proportion to the whole image is the greatest from among the regions for each motion is selected. The output of the estimating unit 306 is input to the image processing unit 100 via the second input unit 104. An input unit 307 to which the past computation result is input is connected to the storage unit 108. The past computation result is input to the estimating unit 306 via the input unit 307.

Figure 4:
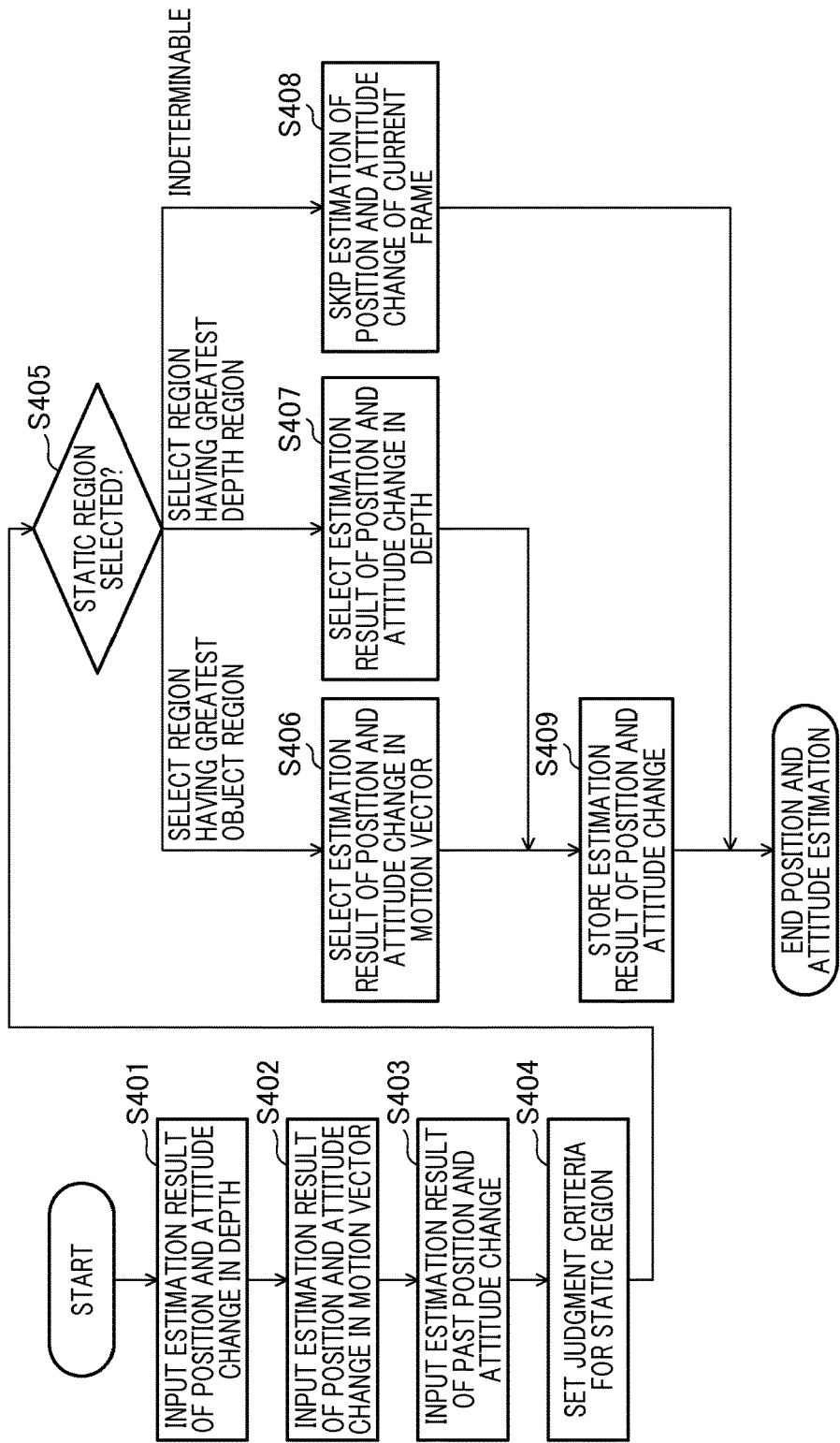
FIG. 4 is a flowchart illustrating the entire operation.

Next, a detailed description will be given of an operation performed by the imaging apparatus 1 with reference to the flowchart shown in FIG. 4. In the present embodiment, in the case of a moving image, position and attitude change estimation processing is performed between continuous frames along the time-axis direction. While it is assumed that the reference frame and the non-reference frame are associated with each other in the time-axis direction, the reference frame and the non-reference frame may not necessarily be adjacent frames. The following processing is repeated until the processing is completed for each frame as the reference frame. Alternatively, each frame may be set as one to be processed as the reference frame in accordance with a user operation.

In step S401, image data obtained by the image acquiring device 101 and depth image data obtained by the depth image acquiring device 102 are input to the first processing unit 200. The first processing unit 200 calculates the first computation result and then outputs it to the first input unit 103. The processing performed by the first processing unit 200 will be described below in detail with reference to the flowchart shown in FIG. 5.

In step S402, image data obtained by the image acquiring device 101 is input to the second processing unit 300. The second processing unit 300 calculates the second computation result and then outputs it to the second input unit 104. The processing performed by the second processing unit 300 will be described below in detail with reference to the flowchart shown in FIG. 11. In step S403, the past computation result stored in the storage unit 108 is input to the image processing unit 100 via the third input unit 406. In step S404, the static region determining unit 105 sets the judgment criteria for determining a static region based on the first computation result input in step S401, the second computation result input in step S402, and the past computation result input in step S403.

In the present embodiment, when the first computation result with use of depth data and the second computation result with use of a motion vector are similar, it is judged that a position and attitude change of a static region is estimated for both the first computation result and the second computation result. The expression "estimation results are similar" is defined as the case where the translational vectors of position and attitude changes have the identical orientation (sign), the difference in size of the translational vectors is less than a threshold value, and the size of the rotation angle of rotational movement is less than a threshold value. In the processing in step S404, one predefined estimation result is calculated. For example, while it is assumed that the first computation result is employed for determining a highly-accurate position and attitude value, the second computation result may also be employed in the case where the second computation result imparts high stability to the position and attitude value. Alternatively, the second computation result and the estimation result of the position and attitude change of the static region may also be averaged to calculate the estimation result of the position and attitude change.

When the first computation result is different from the second computation result, both computation results are compared with, for example, the past computation result, and the processing for setting a region related to the estimation result which is closer to the past computation result, i.e., has a smaller difference from the past computation result than the other estimation result as a static region is performed. For example, assume the case where moving image capturing is performed at a frame rate of 60 fps (frames per second). The time interval between the estimation result of the current position and attitude change and the past computation result is short, e.g., 1/60 seconds. It is highly probable that, in the position and attitude change of the static region, the current position and attitude change is very close to the past position and attitude change even if an image shake occurs. Thus, a region related to the estimation result which is close to the past computation result is set as a static region. In order to avoid false determination of position and attitude as much as possible, a setting may be made such that a static region cannot be judged if no past computation result is stored in the storage unit 108. In the present embodiment, when the first computation result is different from the second computation result and there is no past computation result, a setting may be made such that a static region cannot be judged. The selection guideline for a static region which matches the result intended by a user may also be set in advance by a manual operation so as to perform switching processing as appropriate. The estimation result of the position and attitude change between the preceding frames or a forecast value calculated from the estimation result may also be used.

In step S405, the static region determining unit 105 calculates the position and attitude change of the static region from the region having the greatest object region or the region having the greatest depth region based on the judgment criteria for the static region set in step S404. The term "region having the greatest object region" refers to a region in which the proportion occupied by an object image in an image is the greatest. The term "region having the greatest depth region" refers to a region in which the proportion occupied by depth segmented in an image is the greatest. When the static region determining unit 105 judges that the region having the greatest object region is the static region, the processing proceeds to step S406, whereas when the static region determining unit 105 judges that the region having the greatest depth region is the static region, the processing proceeds to step S407. When the static region cannot be judged, the processing shifts to step S408.

In step S406, the estimation determining unit 107 determines the second computation result input in step S403 as the estimation result of the entire position and attitude change. In step S407, the estimation determining unit 107 determines the first computation result input in step S402 as the estimation result of the entire position and attitude change. In step S408, the estimation determining unit 107 judges that the position and attitude change in the current frame cannot be estimated. Then, the processing for estimating the position and attitude change in the current frame is skipped, and the processing is ended. While, in the present embodiment, it is judged in step S408 that the processing for estimating the position and attitude change in the current frame is not performed, the position and attitude change estimation processing itself may be ended when it is judged that the position and attitude change cannot be estimated. When the difference between the first computation result data and the second computation result data is less than a threshold value, the estimation determining unit 107 may determine the result obtained by weighting computation processing for both data as the position and attitude change of the whole image.

After step S406 or step S407, the processing proceeds to step S409. In step S409, the processing for storing the estimation result selected in step S406 or step S407, i.e., the first computation result data or the second computation result data in the storage unit 108 is executed. In addition, the position and attitude change integration processing is executed to calculate a change in position and attitude state from a certain reference frame, so that the position and attitude change estimation processing for one frame is performed. A certain reference frame is a frame at the start timing of capturing image data. In the position and attitude change integration processing, for example, translational motion component integration is performed as the integration of the elements, and the attitude component integration is performed by quaternion multiplication. As performed by trajectory computation in the Inertial Navigation System, additional measures may be taken such that a change in relative position and attitude between an imaging apparatus and an object to be captured (object to be processed) from a certain reference frame in the uniformed coordinate system can be measured. More specifically, the influence of an attitude change is reflected to the integration coordinate system for the translational motion component, so that the position and attitude change in the uniformed coordinate system can be exactly computed. The position and attitude integration technique in the uniformed coordinate system is disclosed in D. Titterton, "Strapdown Inertial Navigation Technology", p.p. 17-55, 309-332.

The integration result of the position and attitude change from a certain reference frame, which is stored in the storage unit 108, is used for image shake correction or the like. The imaging apparatus 1 shown in FIG. 1 has units such as an imaging optical system and an imaging element both of which are provided in the image acquiring device 101, a correction lens for performing image shake correction for image data obtained by the imaging element, and the like. The control unit 110 of the imaging apparatus 1 includes a CPU (Central Processing Unit) and acquires the position and attitude change data of the whole image determined by the estimation determining unit 107 to calculate an image shake correction amount. The control unit 110 drives a correction lens or the like to perform image shake correction depending on shaking of hands or the like. Image deformation by inverse transformation for cancelling out the integrated position and attitude change is performed for an input image, so that image shake correction can be performed by image processing. For example, image shake correction can be performed by executing projection transformation for image shake caused by the rotational shake of an imaging apparatus. Image shake caused by translational shake in a direction perpendicular to the optical axis of the imaging apparatus can be corrected by executing translational correction inversely proportional to the distance to an object. Translational shake in a direction perpendicular to the optical axis of the imaging apparatus can be corrected by image enlargement/reduction processing.

Next, a description will be given of the processing in step S401 shown in FIG. 4 with reference to FIG. 5.

In step S501, data to be used for the position and attitude change estimation processing is input. More specifically, image capturing by the image acquiring device 101 and depth image capturing by the depth image acquiring device 102 are simultaneously performed. Image data is input to the first processing unit 200 via the image input unit 201 and depth image data is input to the first processing unit 200 via the depth image input unit 202.

In step S502, the three-dimensional point cloud generating unit 203 acquires the image data and the depth image data input in step S501 to generate a three-dimensional point cloud. In the present embodiment, the term "three-dimensional point cloud" refers to a set of points having at least pixel (color/gradient) information and positional information on the three-dimensional coordinate. The pixels of an image can be mapped on the three-dimensional coordinate using a depth image to generate a three-dimensional point cloud. Information about points may include information about the normal or the like. The reason why a three-dimensional point cloud is generated is to determine the positional and attitude relationship between the object to be captured and the imaging apparatus 1 in the three-dimensional space based on two-dimensional image data and two-dimensional depth image data. In step S503, the depth segmenting unit 204 segments the three-dimensional point cloud generated in step S502 for each depth based on the depth image data input in step S501. The depth segmentation processing will be described below in detail with reference to the flowchart shown in FIG. 6.

In step S504, the first estimating unit 205 estimates the position and attitude change for each depth segmented in step S503. The three-dimensional point cloud segmented for each depth in step S503 is defined as the reference frame, and the position and attitude change for each of the segmented depths is estimated based on the reference frame and the non-reference frame. For example, the three-dimensional point cloud at the next sampling timing, which has been generated in step S502 and has been input from the three-dimensional point cloud generating unit 203 directly to the first estimating unit 205 is defined as the non-reference frame. The position and attitude change is estimated by using ICP (Iterative Closest Point) algorithm or the like, and the detail of which will be described below.

In step S505, the grouping processing unit 206 executes processing for grouping the segmented depths for each estimation result in which the position and attitude changes estimated in step S504 are similar.

Figure 10A:
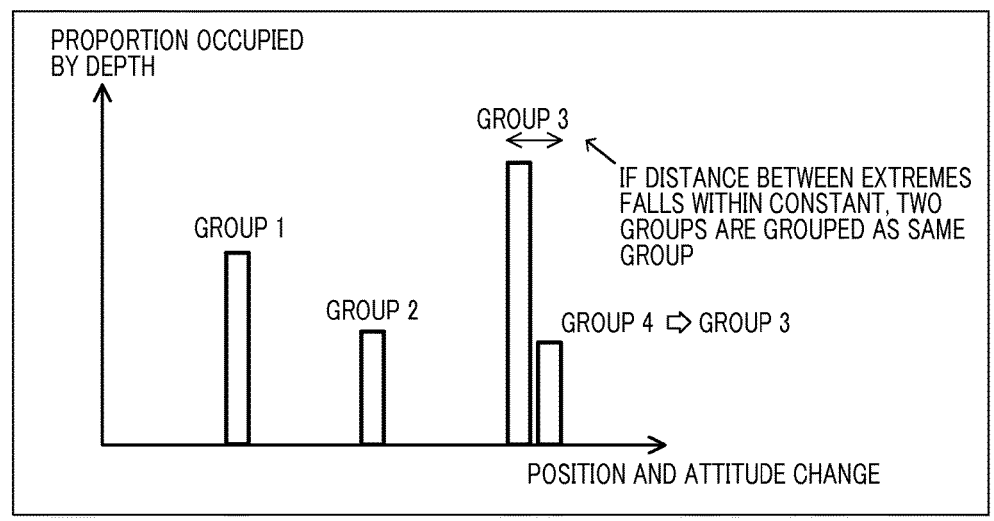
FIGS. 10A and 10B are histograms illustrating the estimation result of the position and attitude change for each of the segmented depths and the proportions occupied by the respective depths corresponding thereto.

FIG. 10A is a diagram for simply illustrating grouping processing. The position and attitude change of one translational component is plotted on the horizontal axis and the frequency of a depth cluster is plotted on the vertical axis. The processing for searching an extreme is executed for a frequency distribution representing the proportion occupied by depth (hereinafter referred to as "occupancy") is executed, and grouping is performed for segments in the vicinity of extremes of locals. When the distance between groups is close, these groups are treated as belonging to the same group. Here, the term "distance between groups is close" refers to the case where the following condition is satisfied.

First condition: the signs indicating the orientations of the translational vectors of position and attitude changes are identical and the difference in size of the translational vectors falls within a threshold value.

Second condition: the size of the rotation angle of rotational movement falls within a threshold value, i.e., the difference in a norm of quaternion falls within a constant value.

In FIG. 10A, the extremes of the locals appear at four locations: a group 1, a group 2, a group 3, and a group 4. In this case, the distance between extremes is close for the group 3 and the group 4, so that the above condition is satisfied. When the distance between groups is close as described above, the estimation results of the group 4 and the group 3 are treated as similar estimation results of the position and attitude change. In other words, the group 4 can be included in the group 3. In this case, the group 4 is integrated into the group 3, so that the group having the greatest frequency becomes the group 3.

Figure 5:
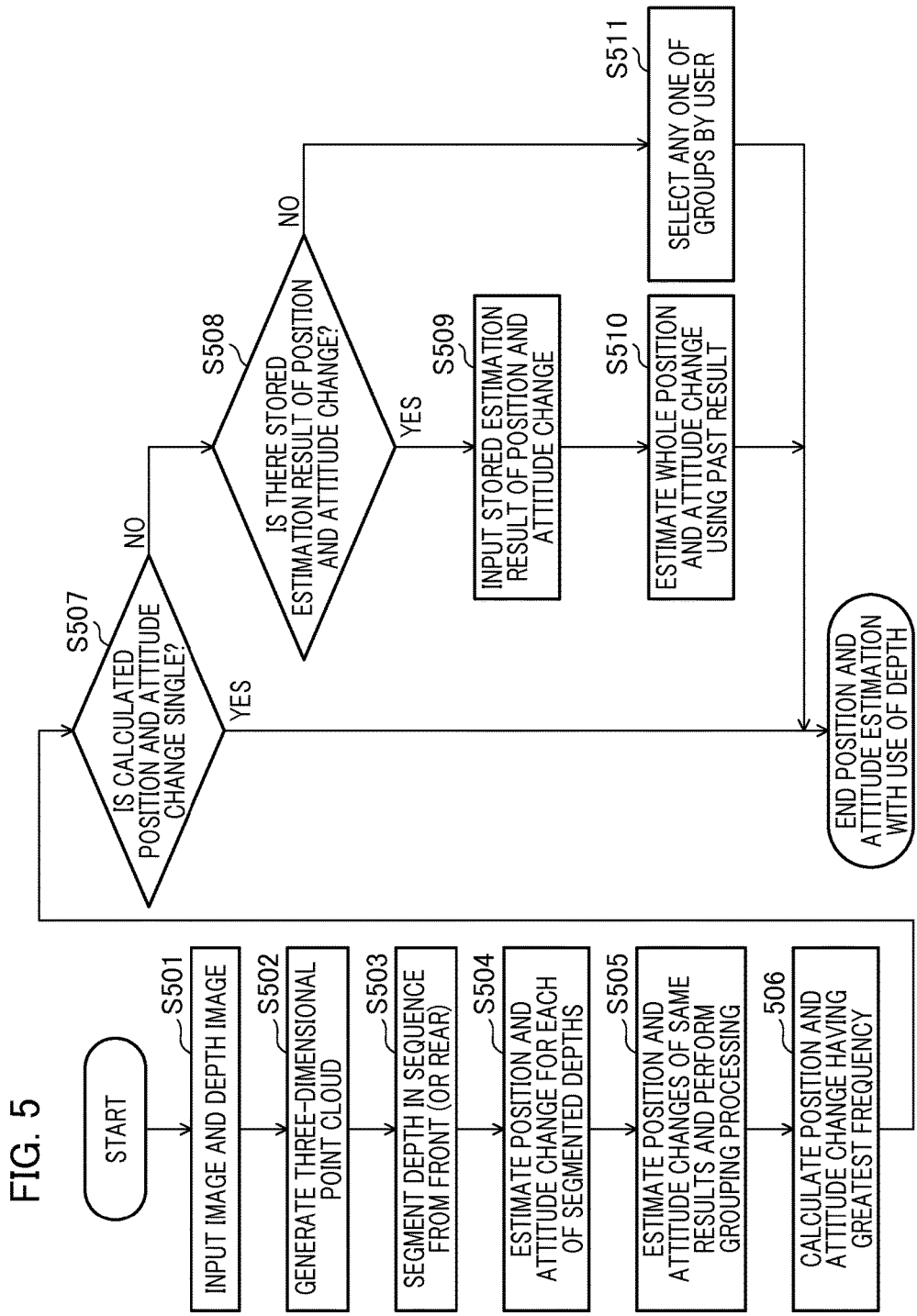
FIG. 5 is a flowchart illustrating an operation performed by the depth data processing unit.

In step S506 shown in FIG. 5, the processing for selecting a group having the greatest frequency corresponding to occupancy from among the estimation results of the position and attitude change subjected to grouping processing in step S505 is executed. More specifically, in the case of the frequency distribution shown in FIG. 10A, the group 3 having the greatest frequency is selected. In other words, the frequency of the group 3 including the group 4 is the greatest.

Figure 10B:
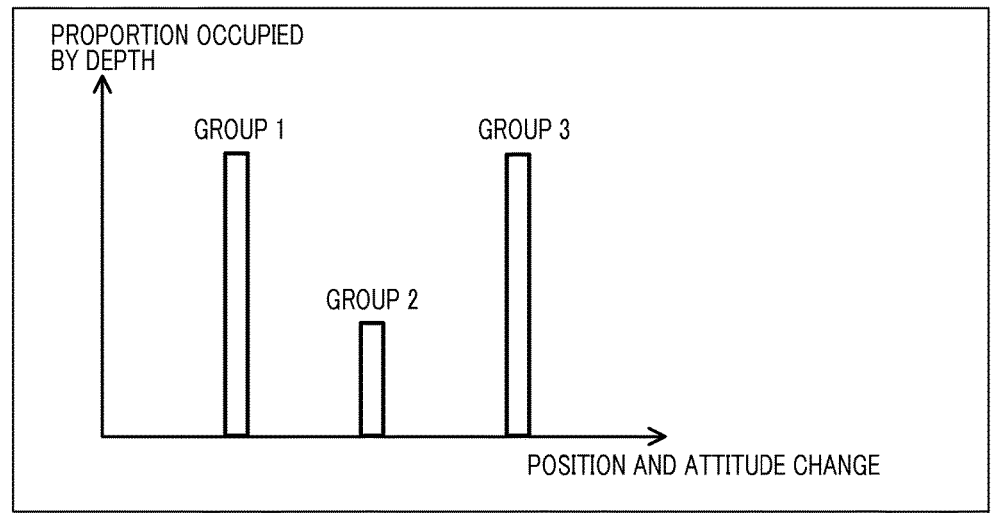

In step S507, processing for identifying whether or not the group selected in step S506 is present in plural is executed. In the example shown in FIG. 10A, since the frequency of the depth cluster of the group 3 is the greatest among the generated three groups, the depth region is judged to be the greatest. The difference between the frequency of the depth cluster of the group 3 and the frequency of the depth cluster of the group 1 having the second-greatest frequency of the depth cluster and the difference between the frequency of the depth cluster of the group 3 and the frequency of the depth cluster of the group 2 having the third-greatest frequency of the depth cluster are calculated and the differences are compared with a preset threshold value. If all the calculation results are equal to or greater than a threshold value, it is judged that a single group is present, and then the position and attitude change estimation processing with use of depth data is ended. If at least one of the calculation results is less than a threshold value, it is judged that a plurality of groups is present, and the processing proceeds to step S508. In the example shown in FIG. 10A, the difference in depth cluster frequency between the group 3 and the group 1 and the difference in depth cluster frequency between the group 3 and the group 2 are equal to or greater than a threshold value. Thus, it is judged that the number of groups having the greatest depth region is single (the group 3 only). In the example shown in FIG. 10B, the difference in depth cluster frequency between the group 3 and the group 1 is less than a threshold value. Thus, it is judged that the number of groups having the greatest depth region is plural, and the processing proceeds to step S508.

When the number of groups having the greatest proportion occupied by depth is single as shown in FIG. 10A, the result obtained in step S506 is selected as a position and attitude change of the whole image, and the position and attitude change estimation processing with use of depth data is ended. In other words, instead of employing the estimation result of the position and attitude change relating to the region of which the proportion to the whole image is the greatest as the entire position and attitude change, the estimation result of the position and attitude change relating to the region in which the proportion occupied by depth is the greatest is employed as the estimation result of the entire position and attitude change. In step S508, it is judged whether or not the past computation result is stored in the storage unit 108. If the past computation result is stored in the storage unit 108, the processing proceeds to step S509, whereas if no past computation result is stored in the storage unit 108, the processing proceeds to step S511.

In step S509, the past computation result stored in the storage unit 108 is input to the second estimating unit 207 via the input unit 208. In step S510, the second estimating unit 207 identifies a dynamic region using the past computation result input in step S509. The second estimating unit 207 estimates the entire position and attitude change by selecting the position and attitude change of the static region from among the position and attitude change estimation results grouped in step S505. In the dynamic region identification processing using the past computation result in step S510, the estimation result of the position and attitude change, which is closest to the past computation result, is selected. For example, when moving image capturing is performed in synchronization with acquisition of a depth image at a frame rate of 60 fps (frames per second), the interval between the current position and attitude change estimation processing time point and the past position and attitude change estimation processing time point is ¹⁄₆₀ seconds. Because of such short interval, it is highly probable that, in the position and attitude change of the static region, the current position and attitude change is very close to the past position and attitude change even if an image shake occurs. Thus, the second estimating unit 207 selects the position and attitude change which is close to the past computation result as the position and attitude change of the static region, and sets the position and attitude change as the estimation result of the position and attitude change of the whole image. In this manner, measures to a moving body momentarily entered in the field angle can be taken, resulting in obtaining a stable estimation result. In other words, if there is a moving body which enters in the field angle in a moment only, the estimation result of the position and attitude change for each of the segmented depths is present in plural. Thus, the processing proceeds from step S507 to step S508 or step S509 shown in FIG. 5. The past computation result acquired in step S509 is the computation result not influenced by the moving body. In step S510, a region having the estimation result of the position and attitude change which is close to the past computation result is selected. Thus, the estimation result is unaffected by a moving body which temporarily enters in the field angle.

In step S511, processing for selecting any one of depths grouped in step S505 is executed. For example, as the selection method, any one of groups is selected by a user operation, and the estimation result of the entire position and attitude change is determined. After step S510 or step S511, the position and attitude change estimation processing with use of depth data is ended.

In the present embodiment, when a group having the greatest occupancy is present in plural (NO in step S507), a group closest to the past computation result is selected in step S510 or an arbitrary group is selected by a user in step S511, so that the estimation result of the position and attitude change is determined. The present invention is not limited thereto but the position and attitude change may be judged to be unable to be estimated at a time point when a group having the greatest occupancy of the depth is present in plural or at a time point when no past computation result is present. In this case, the position and attitude change is not estimated, so that the estimation of the position and attitude change with use of depth data of the current frame is skipped or the position and attitude change estimation processing itself with use of depth data is ended.

Figure 6:
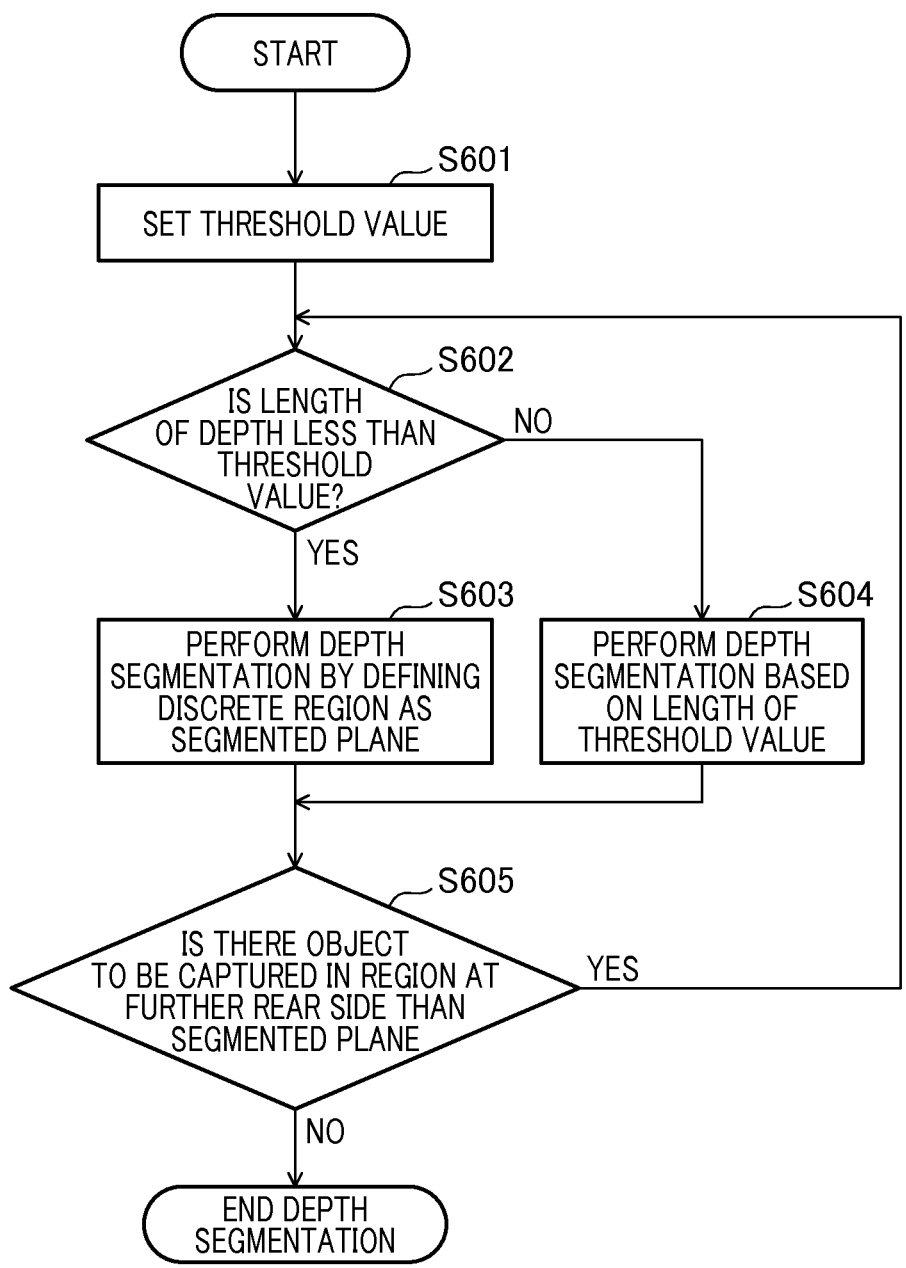
FIG. 6 is a flowchart illustrating the flow of a depth segmenting step.

Next, a description will be given of the depth segmentation processing in step S503 shown in FIG. 5 with reference to FIG. 6. FIG. 7 is an explanatory diagram illustrating depth segmentation in the present embodiment.

Figure 7A:
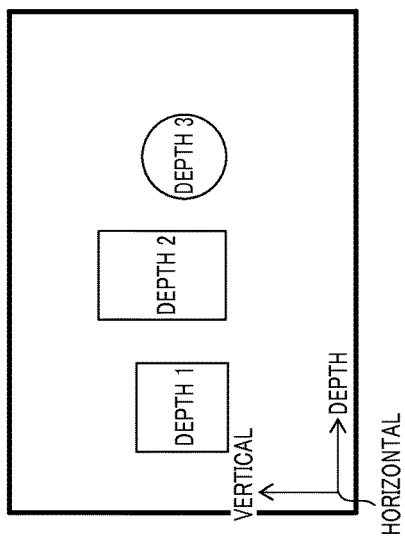
FIGS. 7A to 7F are diagrams illustrating a depth segmenting step.
Figure 7B:
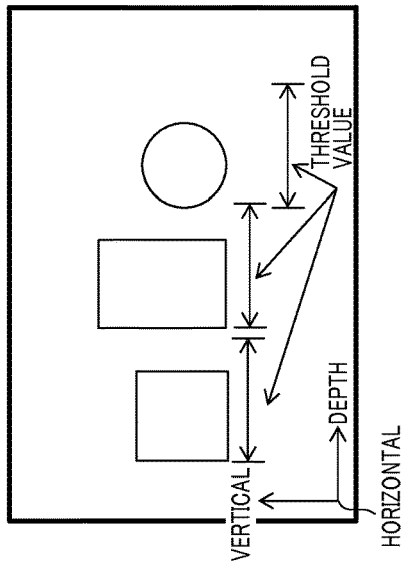

In step S601, the depth segmenting unit 204 sets a threshold value as a reference for segmenting depth. This setting is made such that the length of continuous depth does not exceed a threshold value upon depth segmentation. In step S602, it is judged whether or not a point cloud is present regarding the depth on the three-dimensional coordinate of objects to be captured in order from the front side towards the rear side. It is judged whether or not the length of continuous depth exceeds the threshold value set in step S601. FIG. 7A illustrates an example in which a first pillar and a second pillar, which are cubes arranged in order from the front side as viewed from the imaging apparatus, are objects to be captured. If the length of continuous depth does not exceed a threshold value as shown in FIG. 7B, the processing proceeds to step S603. FIG. 7D illustrates an example in which a rectangular is further arranged in addition to two cubes, i.e., the first pillar and the second pillar. For the rectangular image as shown in FIG. 7E, a three-dimensional point cloud is continuously present from the front side towards the rear side. Thus, it is judged in step S602 that the length of continuous depth exceeds a threshold value, and the processing proceeds to step S604.

Figure 7C:
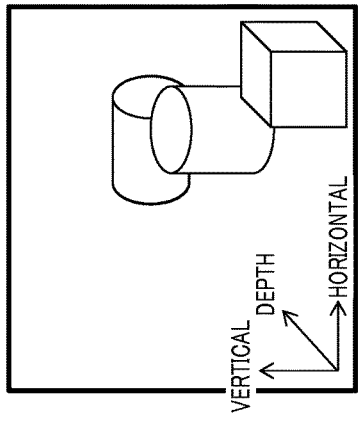
Figure 7D:
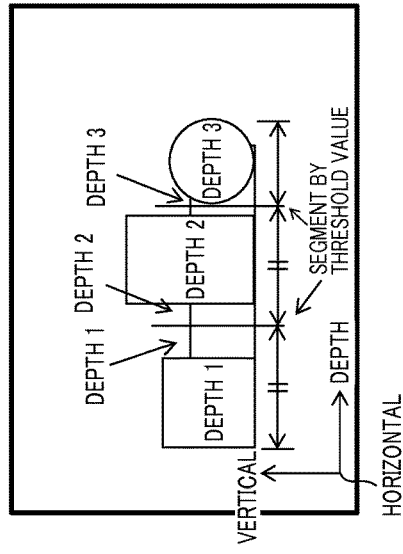
Figure 7E:
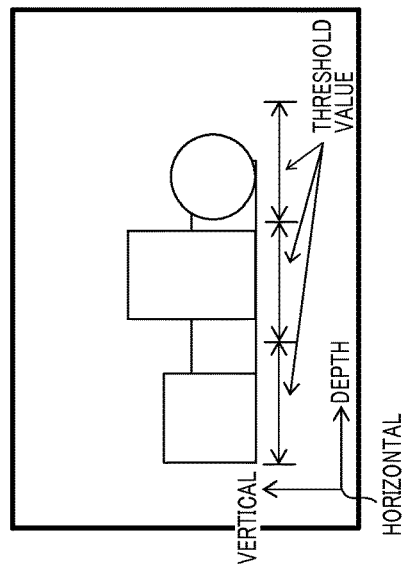
Figure 7F:
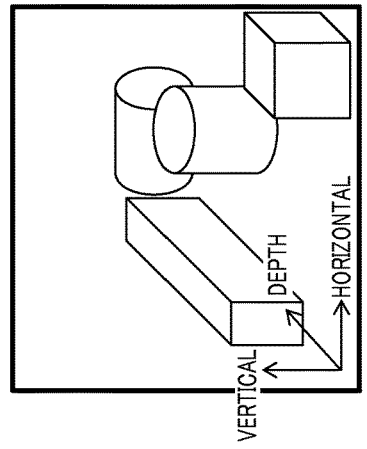

In step S603, it is judged that regions in the depth direction along which no point cloud is present are discrete regions as shown in FIG. 7C, depth segmentation processing is executed such that discrete regions are defined as segmented planes. In FIG. 7C, segmentation is performed for three regions (see depths 1 to 3). On the other hand, in step S604, since the length of continuous depth exceeds a threshold value as shown in FIG. 7F, depth segmentation processing is executed based on a threshold value such that the length of a depth does not exceed the threshold value. In FIG. 7F, a segmented plane is set between the regions of "depth 1" and "depth 2" and between the regions of "depth 2" and "depth 3" depending on a threshold value.

In step S605, processing for determining whether or not an object to be captured is present in a region at the further rear side than the segmented plane is executed. If no object to be captured is present in a region at the further rear side than the segmented plane as a result of determination, the depth segmentation processing is ended, whereas if an object to be captured is present in a region at the further rear side than the segmented plane, the processing returns to step S602. When the processing from step S601 to step S605 is ended, the three-dimensional point cloud generated in step S502 shown in FIG. 5 is segmented into three-dimensional point clouds having the length of continuous depth less than a threshold value. While, in the present embodiment, the depth segmentation processing is performed in order from the front side towards the rear side, the depth segmentation processing may also be performed in order from the rear side towards the front side. Any depth segmentation method may be employed as long as the depth of a region of different objects to be captured can be segmented. For example, the depth may be segmented such that the number of points in the point cloud becomes equal for each of segmented regions or the depth also may be evenly segmented regardless of objects to be captured.

Figure 8B:
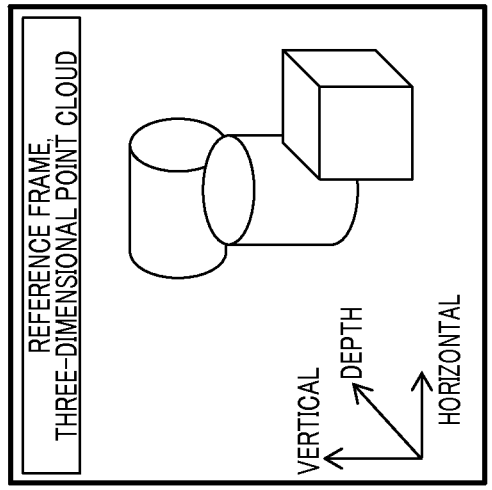
FIGS. 8A to 8F are diagrams illustrating an example of estimation of a position and attitude change for each of the segmented depths and grouping of the segmented depths.
Figure 8A:
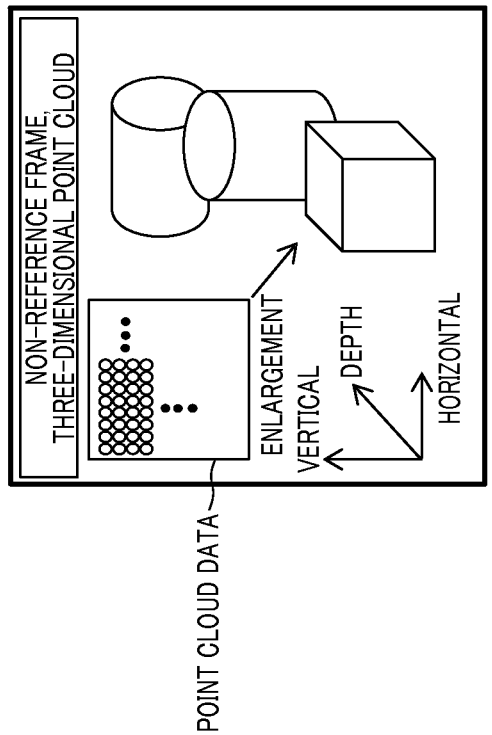

Next, a description will be given of the position and attitude change estimation processing for each depth in step S504 shown in FIG. 5 with reference to FIG. 8. Hereinafter, a three-dimensional point cloud segmented for each depth shown in FIG. 8B is defined as a reference frame and a three-dimensional point cloud at the next sampling timing shown in FIG. 8A is defined as a non-reference frame. FIG. 8 illustrates the case where a position and attitude change is estimated for each of the segmented depths. As in the example shown in FIG. 7C, in the depth segmentation processing using the image shown in FIG. 8B as a reference frame, the depth is segmented into three depths 1 to 3.

Figure 8E:
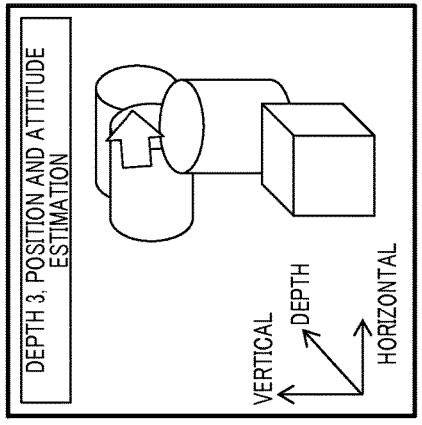
Figure 8D:
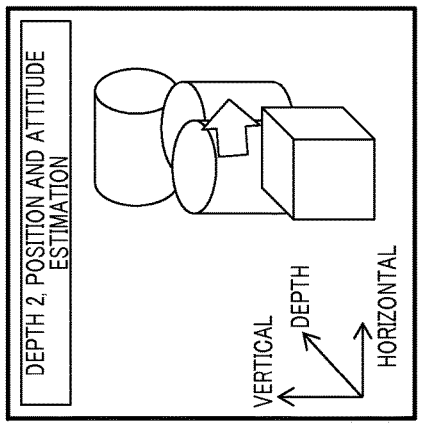
Figure 8F:
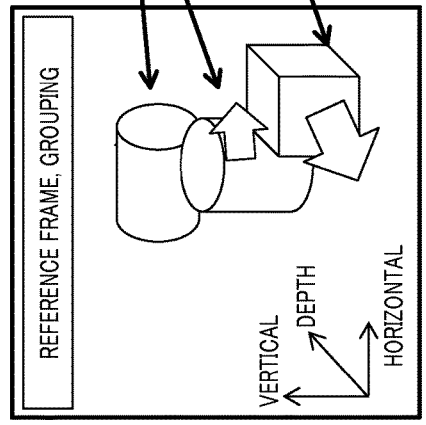
Figure 8C:
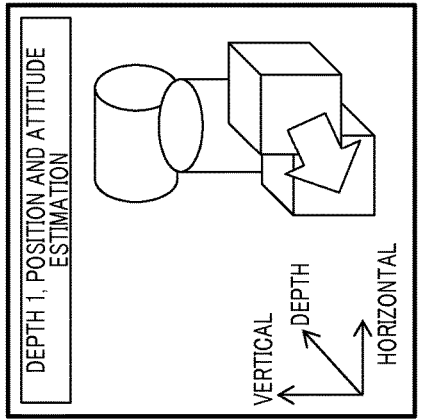

FIG. 8C illustrates the estimation result of the position and attitude change at the first depth "depth 1" and illustrates the position change of cube. FIG. 8D illustrates the estimation result of the position and attitude change at the second depth "depth 2" and illustrates the position change of a first pillar arranged behind the cube. FIG. 8E illustrates the estimation result of the position and attitude change at the third depth "depth 3" and illustrates the position change of a second pillar arranged at the furthest rearward. In each of FIGS. 8C, 8D, and 8E, images of the frames shown in FIGS. 8A and 8B are compared with each other for each of the segmented depths so as to estimate a position and attitude change of the three-dimensional point cloud.

FIG. 8F illustrates an example of grouping. In FIG. 8F, the estimation result of the position and attitude change at the depth 2 is similar to that at the depth 3, and thus, the depth 2 and the depth 3 are integrated into the same group. The estimation result of the position and attitude change at the depth 1 is not similar to that at the depth 2 and the depth 3, and thus, the depth 1 is treated as an independent group. The proportion occupied by the whole depth is increased by grouping the depth 2 and the depth 3 into one group. In this case, as described above, the estimation result of the position and attitude change corresponding to one group obtained by grouping the depth 2 and the depth 3 is selected.

In the present embodiment, a position and attitude change is estimated among a plurality of frames continuous along the time-axis direction, and the reference frame and the non-reference frame are associated with each other in the time-axis direction. The reference frame and the non-reference frame may not necessarily be adjacent frames. A position and attitude change between three-dimensional point clouds is estimated by, for example, ICP algorithm.

Figure 9A:
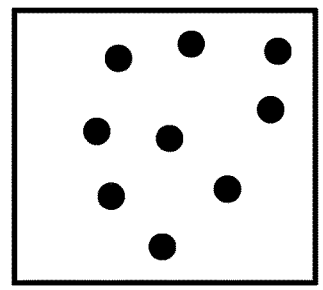
FIGS. 9A to 9E are schematic diagrams illustrating how a position and attitude change between point clouds is estimated by ICP algorithm.
Figure 9B:
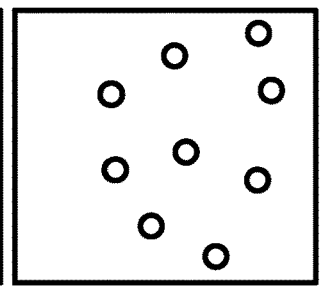
Figure 9C:
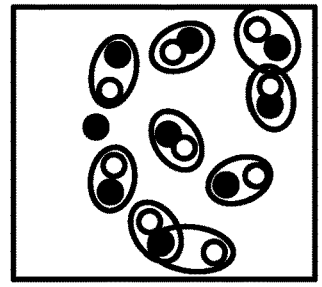
Figure 9D:
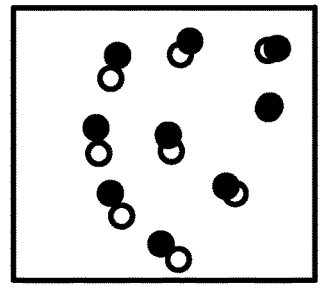
Figure 9E:
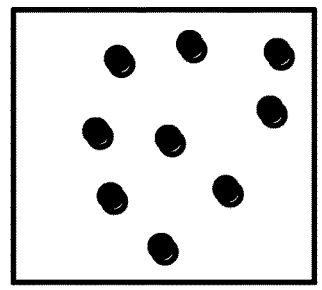

A description will be given of a specific method based on ICP algorithm with reference to the schematic diagram shown in FIG. 9. FIG. 9B shows a point cloud (see empty circles) of a reference frame and FIG. 9A shows a point cloud (see bulleted circles) of a non-reference frame. FIG. 9C shows processing for associating each point of the point cloud of the reference frame shown in FIG. 9B with a point which is closest thereto in the point cloud of the non-reference frame shown in FIG. 9A. The points within a frame are in side-by-side relation with each other as shown in FIG. 9C by enclosing an elliptical frame. FIG. 9D shows how the point cloud (see empty circles) of the reference frame are subject to parallel movement or rotational movement for the distance between corresponding points by a least-squares method such that the point cloud overlaps the point cloud (see bulleted circles) of the non-reference frame. The processing between frames is executed in repetition until the number of times processing exceeds a predetermined number or the sum of the squares of the distance between corresponding points is less than a threshold value after translational or rotational movement. Consequently, a position and attitude change is estimated with a reduced difference in distance between frames as shown in FIG. 9E. For example, parallel movement is represented by a three-dimensional vector including components in the depth, vertical, and horizontal directions and rotational movement is represented by a four-dimensional quaternion. Thus, the position and attitude and its change of points, which are represented by a seven-dimensional space which combines the parallel movement and the rotational movement of points, can be numerically described.

While, in the present embodiment, a description has been given by taking an example of ICP algorithm, any method may also be employed as long as a position and attitude change between image frames can be estimated. For example, while, in the present embodiment, estimation processing is performed by using all the points within a frame, the number of points may also be reduced by random sampling or sampling at regular intervals. While, in the present embodiment, a description has been given by taking an example in which two points which are closest to each other between frames are corresponding points, a method for searching better corresponding points using information about color, normal, or the like of points may also be employed. While, in the present embodiment, a method for generating a three-dimensional point cloud once and then detecting a change between frames is employed, the present invention is not limited thereto, but two-dimensional image data may be grouped for each depth within a predetermined range, and then, image data of groups having the same depth may be compared with each other using the sum of absolute differences or the like to search corresponding points.

Next, a detailed description will be given of the second processing unit 300 with reference to the flowchart shown in FIG. 11.

In step S701, image data for use in estimating a position and attitude change is input. More specifically, an image is captured by the image acquiring device 101, and the captured image data is input to the motion vector calculating unit 302 via the image input unit 301. In step S702, the motion vector calculating unit 302 calculates the motion vector of the image input in step S701. In the present embodiment, a feature point is detected from a reference frame image. Next, a feature point is detected from a non-reference frame image, and then, the feature point of reference frame image is associated with the feature point of the non-reference frame image. A motion vector is calculated from the amount of movement of a corresponding feature point between two images. For example, SIFT (Scale-invariant feature transform) is used for detection and mapping of a feature point. In the SIFT, filtering processing is firstly performed by a Difference-of-Gaussian (DoG) filter, so that extremes in the generated DoG image are set as candidates for a feature point. Next, points having a principal curvature greater than a certain level and points having a contrast less than a certain level are removed from the candidates for a feature point, and the remaining point is determined as a feature point. The intensity gradient of pixels (e.g., 16×16 pixels) around the feature point is calculated to calculate the feature amount of the feature point. Finally, the feature amount of the feature point is compared between two images to determine a combination of high similarities, so that a mapping is established between two images. Detection and mapping of a feature point may be performed not only by SIFT but also by SURF (Speeded Up Robust Feature) or the like. Any method may be employed as long as a mapping between images can be made. For example, there is a method for determining a motion vector by correlation search of a micro region using SSD (Sum of Squared Difference), NCC (Normalized Cross Correlation), or the like. An optical flow search method using a gradient method, block matching for use in an encoding method, and the like may also be used.

In step S703, the region calculating unit 303 performs robust estimation for the motion vector calculated in step S702. For example, the parameter of a motion corresponding to the motion vector having the greatest proportion is calculated by using RANSAC (Random Sample Consensus). In RANSAC, n motion vector data is randomly extracted, and a motion parameter is determined by a least squares method, so that an error between the motion parameter and the remaining data from which n data has been removed from the total data is calculated. If the error falls within an allowable range, voting is provided to a parameter determined from the extracted n data. This processing is performed in repetition, and the parameter having the greatest number of votes is calculated as a motion corresponding to the motion vector having the greatest proportion. As a model for parameters, a projection transformation model or an affine transformation model is used.

In step S704, the region calculating unit 303 estimates a motion vector calculating region having the same motion. In the method for calculating the same motion region, the similarity and the local positional shift between pixels of interest are calculated. Alignment is for the non-reference frame is performed based on the motion parameter. The converted image of the reference frame is represented by ya(X+I), the image of the non-reference frame is represented by yb(X), similarity is represented by R(X, I), coordinate of interest X is represented by [x, y], parallel movement vector I is represented by [i, v], and the region near X is represented by C(X). The similarity R(X, I) can be represented by (Formula 1).

$$R(X, I) = \frac{\sum_{u \in C(X)} (yb(u) * ya(u+I))}{\sqrt{\sum_{u \in C(X)} yb(u)^2 * \sum_{u \in C(X)} ya(u+I)^2}} \quad \text{(Formula 1)}$$

Next, the region calculating unit 303 calculates a local positional shift amount using the similarity R(X, I). A least squares solution of the quadric z(i, j) in (Formula 2) is calculated by using the similarity R(X, I) between i=−1, 0, 1 and j=−1, 0, 1.

$$z(i,j) = ai^2 + bij + cj^3 + di + ej + f \quad \text{(Formula 2)}$$

The region calculating unit 303 defines the set of pixels having the high similarity calculated in (Formula 1) and having the small positional shift amount calculated in (Formula 2) as the same motion vector calculating region.

In step S705, the position and attitude change estimating unit 304 estimates a position and attitude change using a motion vector for each motion vector calculating region estimated in step S704. Firstly, the estimating unit 304 transforms the motion vector from the motion vector value in the pixel coordinate system of the reference frame to the motion vector value in the normalized image coordinate system. The following coordinates are used.

(x, y): pixel coordinates on the reference frame.
($u_d$, $v_d$): normalized image coordinates including distortion.
(u, v): normalized image coordinates with distortion removed therefrom.

The estimating unit 304 transforms pixel coordinates into normalized coordinates using an intrinsic parameter and a distortion coefficient. Firstly, a scaling factor for transforming an intrinsic parameter of the camera into the normalized pixel coordinates is represented by $$(f_{c\_new}k_u, f_{c\_new}k_v)$$

And the center of the pixel coordinates is represented by ($u_0$, $v_0$). The estimating unit 304 transforms pixel coordinates into normalized image coordinates using an intrinsic parameter of the camera. The term inv(X) represents an inverse matrix of the matrix X.

$$\begin{bmatrix} u_d \\ v_d \\ 1 \end{bmatrix} = \text{inv}\left( \begin{bmatrix} f_{c\_new}k_u & 0 & u_0 \\ 0 & f_{c\_new}k_v & v_0 \\ 0 & 0 & 1 \end{bmatrix} \right) \begin{bmatrix} x \\ y \\ 1 \end{bmatrix} \quad \text{(Formula 3)}$$

The intrinsic matrix K of the camera is represented by (Formula 4).

$$K = \begin{bmatrix} f_{c\_new}k_u & 0 & u_0 \\ 0 & f_{c\_new}k_v & v_0 \\ 0 & 0 & 1 \end{bmatrix} \quad \text{(Formula 4)}$$

Furthermore, the estimating unit 304 removes distortion using (Formula 5) and (Formula 6).

$$K = 1 + k_1 r + k_2 r^2 + k_3 r^3 + \ldots$$

$$r^2 = u_d^2 + v_d^2 \quad \text{(Formula 5)}$$

$$u = u_d / K$$

$$v = v_d / K \quad \text{(Formula 6)}$$

The term $k_n$ (where n is a natural number variable) in (Formula 5) represents a distortion coefficient at the nth radial direction. These are distortion caused by the aberration of the optical system. Since distortion varies depending on the capturing condition such as the focal distance of the optical system or object distance, the relationship between distortion and focal distance or the like is calculated from a design value.

Next, the estimating unit 304 performs attitude estimation based on a projection homography. Given that the normalized coordinates of the non-reference frame is defined as ($u_i$, $v_i$), the normalized coordinates of the reference frame is defined as ($u'_i$, $v'_i$), and i=1, 2, . . . , m (where m is the number of corresponding points), the following linear formula is obtained for the projection homography.

$$\begin{bmatrix} 0 & 0 & 0 & -u_i & -v_i & -1 & v'_i u_i & v'_i v_i & v'_i \\ u_i & v_i & 1 & 0 & 0 & 0 & -u'_i u_i & -u'_i v_i & -u'_i \\ \vdots & \vdots & \vdots & \vdots & \vdots & \vdots & \vdots & \vdots \\ 0 & 0 & 0 & -u_m & -v_m & -1 & v'_m u_m & v'_m v_m & v'_m \\ u_m & v_m & 1 & 0 & 0 & 0 & -u'_m u_m & -u'_m v_m & -u'_m \end{bmatrix} \quad \text{(Formula 7)}$$

$$\begin{bmatrix} h_{11} \\ h_{12} \\ h_{13} \\ h_{21} \\ h_{22} \\ h_{23} \\ h_{31} \\ h_{32} \\ h_{33} \end{bmatrix} = 0$$

The linear expression is overdetermined if the number m of the corresponding points is equal to or larger than eight. The expression (Formula 7) can be solved as a linear least square expression to provide the following:

$h = \{h_{11}, \ldots, h_{33}\}$

This is shaped into a matrix of 3×3 to provide the projective homography represented as follows, that is, the image variation amount between frames:

$$H = \begin{bmatrix} h_{11} & h_{12} & h_{13} \\ h_{21} & h_{22} & h_{23} \\ h_{31} & h_{32} & h_{33} \end{bmatrix} \quad \text{(Formula 8)}$$

Next, the estimating unit 304 decomposes the projection homography into camera work rotation R, a direction vector of a plane approximate to an object in a scene, and $\vec{n}$ the product of the translational direction vector $\vec{t}$ and the depth d.

$\vec{t}/d$

Two possible solutions are calculated with the following procedure. The decomposition of the projective homography into the two solutions is performed by using eigenvalue resolution or singular value resolution to find an invariant. Although various manners of solution may be used, the following description will be made with reference to the approach used in B. Triggs, "Auto calibration from Planar Scene", European Conference on Computer Vision (ECCV '98).

The relationship between the projective homography H and the camera works and scene arrangement is represented by the following expression:

$$H = \lambda \left( R + \frac{1}{d} \vec{n} \vec{t}^T \right) \quad \text{(Formula 9)}$$

In (Formula 9), $R$ and $\vec{t}$ represent the rotation and the translation of the camera, respectively. The symbol "d" represents the distance to the reference plane.

$\vec{n}$ is the normal to the reference plane in the direction away from the camera, and the symbol "λ" represents an arbitrary constant. Here, in calculation from two images, the product of the distance d to a spatial plane and a norm of a translation camera work cannot be resolved.

$\text{norm}(\vec{t})$

The term "norm" refers to the amount representing the size of the vector. In other words, $\vec{t}$ is a unit direction vector representing the translation direction, and $\text{norm}(\vec{t}) = 1$ where d is handled as the product of the distance to the spatial plane and the size of the translation amount. Assuming that all the corresponding points on a plane are the following vectors:

$\vec{x}_1, \vec{x}_2$ the sign of the projection nomography H is selected so as to satisfy the following relationship.

$\vec{x}_2^T H \vec{x}_1 > 0$

The singular value resolution of H is given as $H = USV^T$ where U and V represent 3×3 rotation matrixes.

$S = \text{diag}(\sigma_1, \sigma_2, \sigma_3)$ represents a positive descending diagonal element, $\sigma_1 \geq \sigma_2 \geq \sigma_3 \geq 0$ and is set to the singular value of H. Column elements of U and V that are associated orthogonal matrixes are represented as $u_1, u_2, u_3$ and $v_1, v_2, v_3$ For example, when a plurality of cameras is used, the reference system of a first camera is employed and a three-dimensional plane is represented by:

$\vec{n}^T \vec{x} = d = 1/\zeta$

Where $\vec{n}$ represents the outward normal (direction away from the camera).

$\zeta = 1/d \ (\geq 0)$ represents the reciprocal of the distance to the plane. In the reference system, the first camera has a 3×4 projection matrix:

$P_1 = [I_{3\times3} | \vec{0}]$

In a second camera, $P_2 = R[I_{3\times3} | t] = [R | t']$ where $t' = -Rt$ t and t' represent translation between the cameras, that is, represent translation from the optical axis center of the first camera to the optical axis center of the second camera, and R represents rotation between the cameras.

The nomography from the reference frame image to the non-reference frame image is represented by:

$$H = RH_1$$

where $$H_1 = I_{3 \times 3} - \zeta \vec{t} \vec{n}^T$$

For a three-dimensional point on the plane, $$\vec{x}$$

$$H\vec{x} = R(\vec{x} - \zeta \vec{t} \vec{n}^T \vec{x}) = R(\vec{x} - \vec{t}) \approx P_2 \vec{x}$$

holds because $$\zeta \vec{n}^T \vec{x} = 1$$

is given. For a three-dimensional point on the plane, when $$\vec{x}$$

is handled as an arbitrary point in the reference frame image, the difference is only the whole scale factor. Only the product $$\zeta \vec{t} \vec{n}^T$$

is restorable, so that normalization is performed with $$\|t\| = \|n\| = 1$$

That is, the plane distance $1/\zeta$ is measured in a unit base length.

$$\|t\|$$

A depth positive constraint test to be described below is performed to determine the possible sign.

In the singular value resolution, $$H = USV^T$$

and $$H_1 = U_1 SV^T$$

are identical for the element of R, that is, $$U = RU_1$$

In $H_1$, the vector product $$\vec{t} \times \vec{n}$$

is invariant. If the singular value is obvious, $$\vec{t} \times \vec{n}$$

should correspond to a singular vector. Thus, it is apparent that this is always the second singular vector $v_2$. Thus, correction normalization of H is performed as $$H \rightarrow H/\sigma_2$$

That is, $$(\sigma_1, \sigma_2, \sigma_3) \rightarrow (\sigma_1/\sigma_2, 1, \sigma_3/\sigma_2)$$

In the following, it is assumed that normalization with $\sigma_2$ is already performed.

In the reference frame, when it is given that $$\vec{t} \times \vec{n}$$

corresponds to $v_2$, a partial space $$\{\vec{t}, \vec{n}\}$$

should be occupied by $$\{v_1, v_3\}$$

That is, $$\vec{n} = \beta \vec{v}_1 - \alpha \vec{v}_3$$

$$\vec{n} \times (\vec{t} \times \vec{n}) \approx \alpha \vec{v}_1 + \beta \vec{v}_3$$

hold for arbitrary parameters $$\alpha$$

$$\beta$$

$$(\alpha^2 + \beta^2 = 1)$$

An arbitrary direction orthogonal to $$\vec{n}$$

$$\vec{n} \times (\vec{t} \times \vec{n})$$

has a norm which is invariant with H or $H_1$. In this case, $$(\alpha \sigma_1)^2 + (\beta \sigma_3)^2 = \alpha^2 + \beta^2$$

or $$(\alpha, \beta) = (\pm\sqrt{1 - \sigma_3^2} \pm \sqrt{\sigma_1^2 - 1})$$

holds.

If $$\vec{t} \times \vec{n}$$

corresponds to the above $v_1$ or $v_3$, no solution is found. Thus, it can correspond to only $v_2$.

Strictly, the same argument on the left-hand side shows $$R\vec{t} = -(\beta u_1 + \alpha u_3)$$

If $$\vec{t}$$

satisfies an eigenvector $$1 - \zeta \vec{n}^T \vec{t}^T$$

which is an eigenvalue of $H_1$, $$H\vec{t} = (1 - \zeta \vec{n}^T \vec{t}) R\vec{t}$$

is given. Thus, $$t \approx H^{-1}(R\vec{t}) \approx \beta/\sigma_1 \vec{v}_1 + \alpha/\sigma_3 \vec{v}_3$$

holds. After simplification, $$\zeta = \sigma_1 - \sigma_3$$

holds.

The columns $$\vec{u}_1, \vec{u}_2, \vec{u}_3$$

of $U_1$ that is the left-hand side of the singular value resolution of $H_1$ is restorable with the notation of $$\vec{u}_2 = \vec{v}_2,$$

and $$\vec{t}$$

needs to be an eigenvector of $H_1$. In this case, $$\vec{u}_1 = \gamma \vec{v}_1 + \delta \vec{v}_3$$

$$\vec{u}_3 = \delta \vec{v}_1 - \gamma \vec{v}_3$$

hold. After simplification, $$(\gamma, \delta) \approx (1 + \sigma_1 \sigma_3, \pm \alpha \beta)$$

holds. Thus, $$R = UU_1^T = U \begin{bmatrix} \gamma & 0 & \delta \\ 0 & 1 & 0 \\ -\delta & 0 & \gamma \end{bmatrix} V^T \quad \text{(Formula 10)}$$

is assumed and finally the rotation matrix R is obtained.

Hereinafter, a series of specific processing for calculating the two possible solutions for resolving the image variation amount into the camera work R including the rotation and translation, and the scene arrangement consisting of the direction vector $$\vec{t},$$

the depth position d of the reference plane in space, and the direction vector $$\vec{n}$$

is collectively shown by the following expression:

$$[U, S, V] = svd(H) \quad \text{(Formula 11)}$$

$$\sigma_1' = \sigma_1 / \sigma_2 \quad \text{(Formula 12)}$$
$$\sigma_3' = \sigma_3 / \sigma_2$$

where $$S = \begin{bmatrix} \sigma_1 & 0 & 0 \\ 0 & \sigma_2 & 0 \\ 0 & 0 & \sigma_3 \end{bmatrix} \quad \text{(Formula 13)}$$

$$\sigma_1 \geq \sigma_2 \geq \sigma_3 \geq 0$$

$$\zeta = (1/d) = \sigma_1' - \sigma_3' \quad \text{(Formula 14)}$$

$$a_1 = \sqrt{1 - \sigma_3'^2} \quad \text{(Formula 15)}$$
$$b_1 = \sqrt{\sigma_1'^2 - 1}$$

$$a = a_1 / \sqrt{a_1^2 + b_1^2} \quad \text{(Formula 16)}$$
$$b = b_1 / \sqrt{a_1^2 + b_1^2}$$

$$c = (1 + \sigma_1' \sigma_3') / \sqrt{(1 + \sigma_1' \sigma_3')^2 + (a_1 b_1)^2} \quad \text{(Formula 17)}$$
$$d = (a_1 b_1) / \sqrt{(1 + \sigma_1' \sigma_3')^2 + (a_1 b_1)^2}$$

$$e = (-b / \sigma_1') / \sqrt{(-b / \sigma_1')^2 + (-a / \sigma_3')^2} \quad \text{(Formula 18)}$$
$$f = (-a / \sigma_3') / \sqrt{(-b / \sigma_1')^2 + (-a / \sigma_3')^2}$$

$$\vec{v}_1 = V(:, 1) \quad \text{(Formula 19)}$$
$$\vec{v}_3 = V(:, 3)$$
$$\vec{u}_1 = U(:, 1)$$
$$\vec{u}_3 = U(:, 3)$$

The above can be used to determine the two possible solutions expressed by:

$$\{R_1, \vec{t}_1, \vec{n}_1\} \quad \text{(Formula 20)}$$
$$\{R_2, \vec{t}_2, \vec{n}_2\}$$

where $$\vec{n}_1 = b\vec{v}_1 - a\vec{v}_3$$
$$\vec{n}_2 = b\vec{v}_1 + a\vec{v}_3$$

$$R_1 = U \begin{bmatrix} c & 0 & d \\ 0 & 1 & 0 \\ -d & 0 & c \end{bmatrix} V^T \quad \text{(Formula 21)}$$

$$R_2 = U \begin{bmatrix} c & 0 & -d \\ 0 & 1 & 0 \\ d & 0 & c \end{bmatrix} V^T$$

$$\vec{t}_1 = -(b\vec{u}_1 + a\vec{u}_3) \quad \text{(Formula 22)}$$
$$\vec{t}_2 = -(b\vec{u}_1 - a\vec{u}_3)$$

(corresponding to $P_2 = [R | t]$)

A promise (depth positive constraint) that the direction vector $$\vec{n}$$

is outward is introduced to the two possible solutions. The two possible solutions are calculated by achieving consistency with the sign of if $$\text{if}(\vec{n}_1(3) < 0) \vec{t}_1 = -\vec{t}_1, \vec{n}_1 = -\vec{n}_1 \quad \text{(Formula 22)}$$

and if $$\text{if}(\vec{n}_2(3) < 0) \vec{t}_2 = -\vec{t}_2, \vec{n}_2 = -\vec{n}_2 \quad \text{(Formula 23)}.$$

Then, Epipolar error check is performed to extract one solution with less error.

The Epipolar error check is executed as follows. For a set of two solutions $$\{R_1, \vec{t}_1 / d, \vec{n}_1\}$$

and $$\{R_2, \vec{t}_2 / d, \vec{n}_2\}$$

for attitude change and scene information obtained by resolving the nomography calculated using the corresponding points $$\vec{x}_1, \vec{x}_2,$$

Epipolar errors are calculated using the corresponding points. The Epipolar error is represented by:

$$e_i = \sum_j^n \left( \vec{x}_2^{jT} ([\vec{t}_i]_x R_i) \vec{x}_1^j \right), i = 1, 2, j = 1, 2, \ldots, n \quad \text{(Formula 24)}$$

where n represents the number of the corresponding points. The solution with less error is selected as a true solution. In this manner, the only one solution of $$\{R, \vec{t}, \vec{n}, d\}$$

representing the camera work between the input frames. In this manner, the position and attitude change with use of a motion vector is estimated. Although not described, attitude estimation (R. Hartley, A. Zisserman, "Multiple View Geometry in Computer Vision", Cambridge Univ. Press (2000)) and the 5-point method (Bill Triggs, "Routines for Relative Pose of Two Calibrated Cameras from 5 Points", Documentation, INRIA. juillet 2000.) based on a base matrix, which is the method for estimating the attitude of a camera with respect to a non-planar scene assuming a pinhole camera model can be realized based on a known technique.

Figure 11:
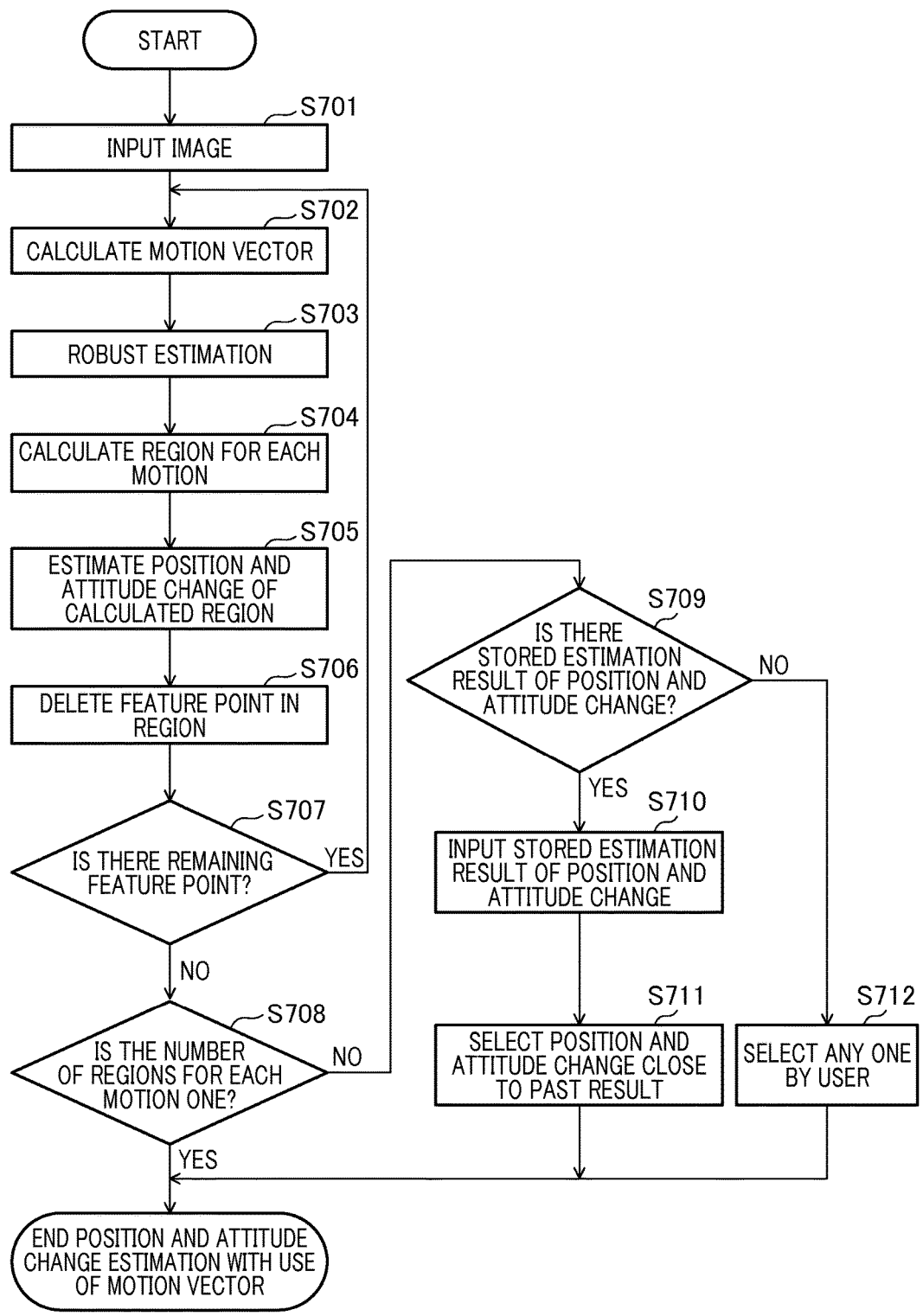
FIG. 11 is a flowchart illustrating an operation performed by the motion vector processing unit.

In step S706 shown in FIG. 11, the deleting unit 305 configured to delete a feature point in a region deletes a calculated point of a motion vector in a region for each motion calculated in step S704, i.e., a feature point. In step S707, the deleting unit 305 judges whether or not there are remaining feature points outside the motion region calculated in step S704. If there are remaining feature points outside the motion region, the processing returns to step S702. In step S706, mapping is performed again at the feature points which have not been deleted, and thus, the motion vector and the region for each motion using the remaining region are calculated. By stepwisely calculating a region for each motion, a plurality of motions can be calculated. If it is judged in step S707 that there is no remaining feature point outside the motion region, the processing proceeds to step S708. In step S708, the estimating unit 306 judges whether or not a region for each motion calculated in step S704 is single or plural. For example, it is judged whether or not a motion having a large number of pixels in a region is single or plural by setting a threshold value for comparison. If the number of regions is single, the estimating unit 306 sets the position and attitude change estimated in step S705 as the entire position and attitude change, and then ends the processing. If the number of regions is plural, the processing proceeds to step S709.

Figure 13A:
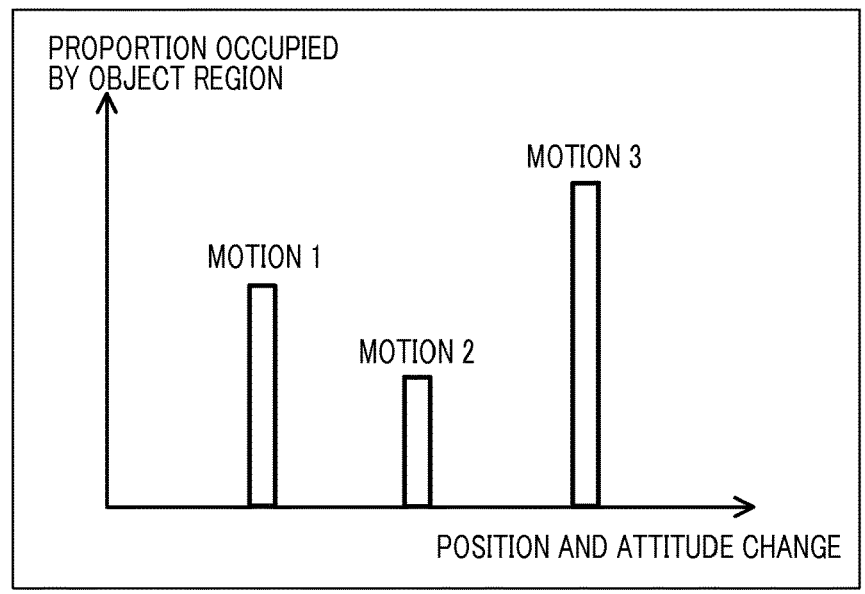
FIGS. 13A and 13B are histograms illustrating the estimation result of the position and attitude change of a region for each motion and the proportions occupied by the respective object regions corresponding thereto.
Figure 13B:
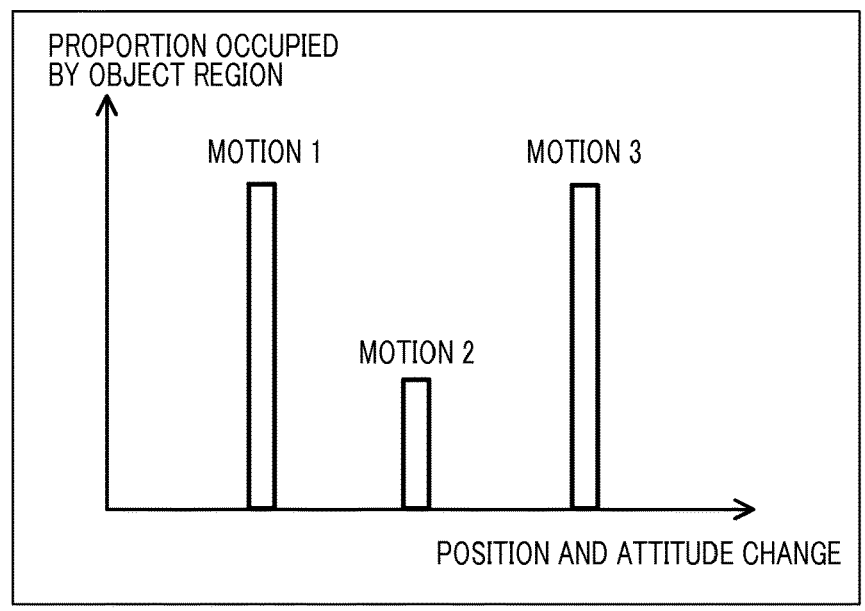

A description will be given of judgment processing in step S708 with reference to FIG. 13. In FIG. 13, the position and attitude change of one translational component is plotted on the horizontal axis and the frequency of an object cluster is plotted on the vertical axis. The vertical axis corresponds to the proportion occupied by an object region in an image. In the example shown in FIG. 13A, three motions are detected. Since the frequency of the object cluster of the motion 3 is the greatest among the three motions, the object region thereof is judged to be the greatest. The difference between the frequency of the object cluster of the motion 3 and the frequency of the object cluster of the motion 1 having the second-greatest frequency of the object cluster and the difference between the frequency of the object cluster of the motion 3 and the frequency of the object cluster of the motion 2 having the third-greatest frequency of the object cluster are calculated. The calculation results are compared with a preset threshold value. If all the calculation results are equal to or greater than a threshold value, it is judged that a single motion is present, and then the position and attitude change estimation processing with use of a motion vector is ended. If at least one of the calculation results is less than a threshold value, it is judged that a plurality of motions has been calculated, and the processing proceeds to step S709 shown in FIG. 11. In the example shown in FIG. 13A, the difference in object cluster frequency between the motion 3 and both the motion 1 and the motion 2 is equal to or greater than a threshold value. Thus, it is judged that the motion 3 having the greatest object region is single. On the other hand, in FIG. 13B, the difference in object cluster frequency between the motion 3 and the motion 1 is less than a threshold value. Thus, it is judged that the number of motions having the greatest object region is plural.

In step S709 shown in FIG. 11, it is judged whether or not the past computation result is stored in the storage unit 108. If the past computation result is stored in the storage unit 108, the processing proceeds to step S710, whereas if no past computation result is stored in the storage unit 108, the processing shifts to step S712. In step S710, the past computation result stored in the storage unit 108 is input to the estimating unit 306 via the input unit 307.

In step S711, the estimating unit 306 identifies a dynamic region using the past computation result input in step S710. The estimating unit 306 determines the entire position and attitude change by selecting the estimation result of the position and attitude change of the static region from among the position and attitude change results estimated in step S705. In the dynamic region identification processing using the past computation result, the estimation result of the position and attitude change, which is closest to the past computation result, is selected. For example, when moving image capturing is performed at a frame rate of 60 fps, the interval between the estimation result of the current position and attitude change and the past computation result is 1/60 seconds. Because of such short interval, it is highly probable that, in the position and attitude change of the static region, the current position and attitude change is very close to the past position and attitude change even if an image shake occurs. Thus, the estimating unit 306 sets the position and attitude change which is close to the past computation result as the position and attitude change of the static region, and determines the position and attitude change as the estimation result of the entire position and attitude change. In this manner, measures to a moving body momentarily entered in the field angle can be taken, resulting in obtaining a stable estimation result. In other words, the estimation result is unaffected by a moving body which enters in the field angle in a moment only.

In step S712, any position and attitude change is selected from among the estimation results of the position and attitude change obtained in step S705 by a user operation, and the estimating unit 306 determines the entire position and attitude change from the selected position and attitude change. After step S711 or step S712, the position and attitude change estimation processing with use of a motion vector is ended.

Figure 12A:
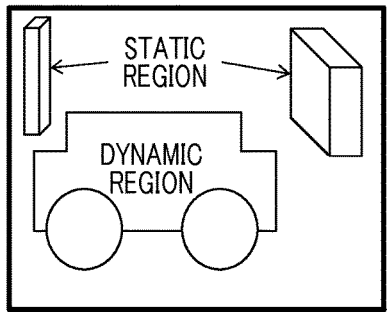
FIGS. 12A to 12F are diagrams illustrating estimation of a position and attitude change based on the greatest region in an image and estimation of a position and attitude change based on the greatest region occupied by depth.
Figure 12B:
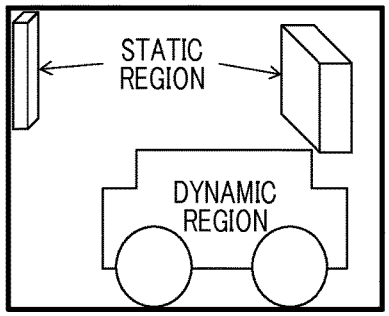
Figure 12C:
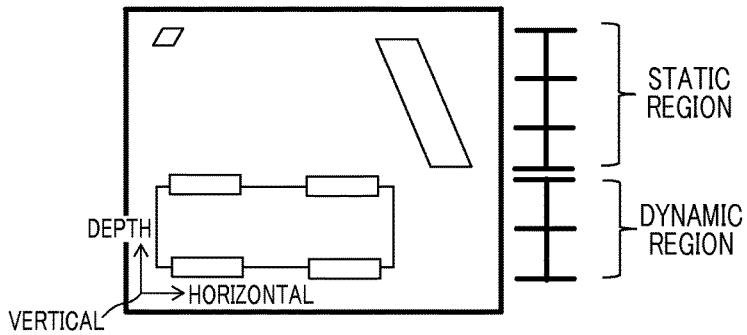
Figure 12D:
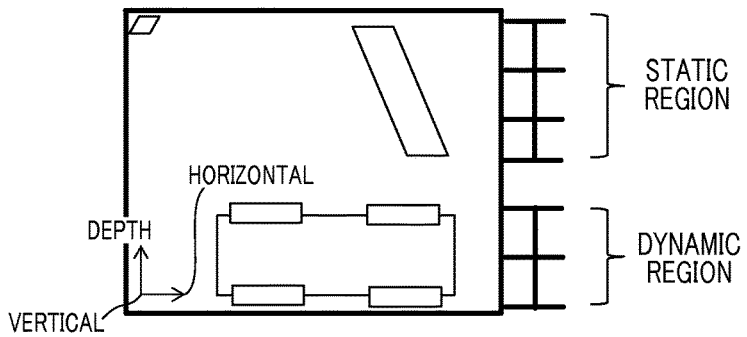
Figure 12E:
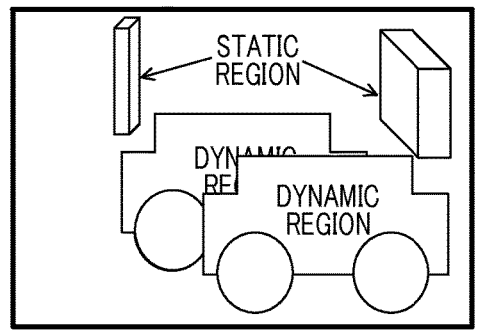
Figure 12F:
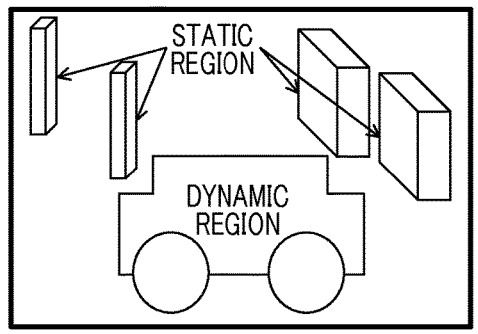

Next, a description will be given of the effects of the present embodiment with reference to FIG. 12. FIG. 12A illustrates the proportion of a region in a non-reference frame image, and FIG. 12B illustrates the proportion of a region in a reference frame image. FIG. 12C illustrates the proportion of depth relating to the dynamic region and the static region in the non-reference frame. FIG. 12D illustrates the proportion of depth relating to the dynamic region and the static region in the reference frame. FIG. 12E is a diagram illustrating the estimation result of the position and attitude change according to the present embodiment. FIG. 12F is a diagram illustrating the estimation result of the position and attitude change by the conventional method.

In both FIGS. 12A and 12B, the dynamic region occupies more area in an image than the static region. On the other hand, as shown in FIGS. 12C and 12D, the static region has greater proportion occupied by depth than the dynamic region. When the position and attitude change in the image shown in FIGS. 12A and 12B is estimated by the conventional method, a large number of motion vectors or corresponding points used for calculation appears in the dynamic region as compared with the static region. Thus, it is highly probable that the position of the dynamic region does not change as shown in FIG. 12F, resulting in readily obtaining the estimation result affected by the dynamic region.

In contrast, when the position and attitude change in the image shown in FIGS. 12C and 12D is estimated by the present embodiment, the position and attitude change of the static region having the greater proportion occupied by depth is estimated. The position of the static region is invariant as shown in FIG. 12E. In other words, the dynamic region can be excluded from the calculation result, so that the position and attitude change which is hardly affected by the dynamic region can be estimated.

Note that, when the dynamic region becomes the greatest proportion occupied by depth, the processing method alone may lead to a false estimation result. Accordingly, estimation of the position and attitude change with use of a motion vector is performed with estimation of the position and attitude change with use of depth data, so that the position and attitude change of the region which occupies a large area in an image is estimated. Estimation accuracy can be improved by ensuring the consistency of estimation of the position and attitude change by the above two processing methods. For example, unnatural correction affected by the dynamic region may be made by the conventional image shake correction (anti-vibration control) of the imaging apparatus. In contrast, in the present embodiment, image shake correction which is hardly affected by the dynamic region can be realized.

Variant Example

Next, a description will be given of a variant example of the first embodiment. In the variant example, the following points are different from the above embodiment.

(A) Each of the first processing unit 200 with use of depth data and the second processing unit 300 with use of a motion vector uses the past estimation result to select the estimation result of the position and attitude change other than the greatest region.

In the above embodiment, each of the first processing unit 200 and the second processing unit 300 selects the estimation result of the position and attitude change relating to one region having the greatest proportion. The image processing unit 100 calculates the estimation result of the entire position and attitude change depending on the similarity between the estimation results of the position and attitude change or by comparing the estimation results with the past computation result. In contrast, in the variant example, the estimation result of the position and attitude change relating to the greatest region is not necessarily selected but depends on the result of comparison with the past estimation result.

(B) Each of the first processing unit 200 with use of depth data and the second processing unit 300 with use of a motion vector inputs the estimation result of the position and attitude change relating to the whole region to the image processing unit 100.

In this case, the processing for setting the judgment criteria for the static region is executed by comparing all the estimation results of the position and attitude changes with use of depth data, all the estimation results of the position and attitude changes with use of a motion vector, with the estimation result of the past position and attitude change. Furthermore, the setting processing is combined with the processing for manually selecting the judgment criteria which matches the result intended by a user, so that the estimation result of the position and attitude change which is hardly affected by the dynamic region may be obtained as expected by the user.

Second Embodiment

Next, a description will be given of an imaging apparatus according to a second embodiment of the present invention. In the second embodiment, the same elements as those in the first embodiment are designated by the same reference numerals and explanation thereof will be omitted.

Figure 14:
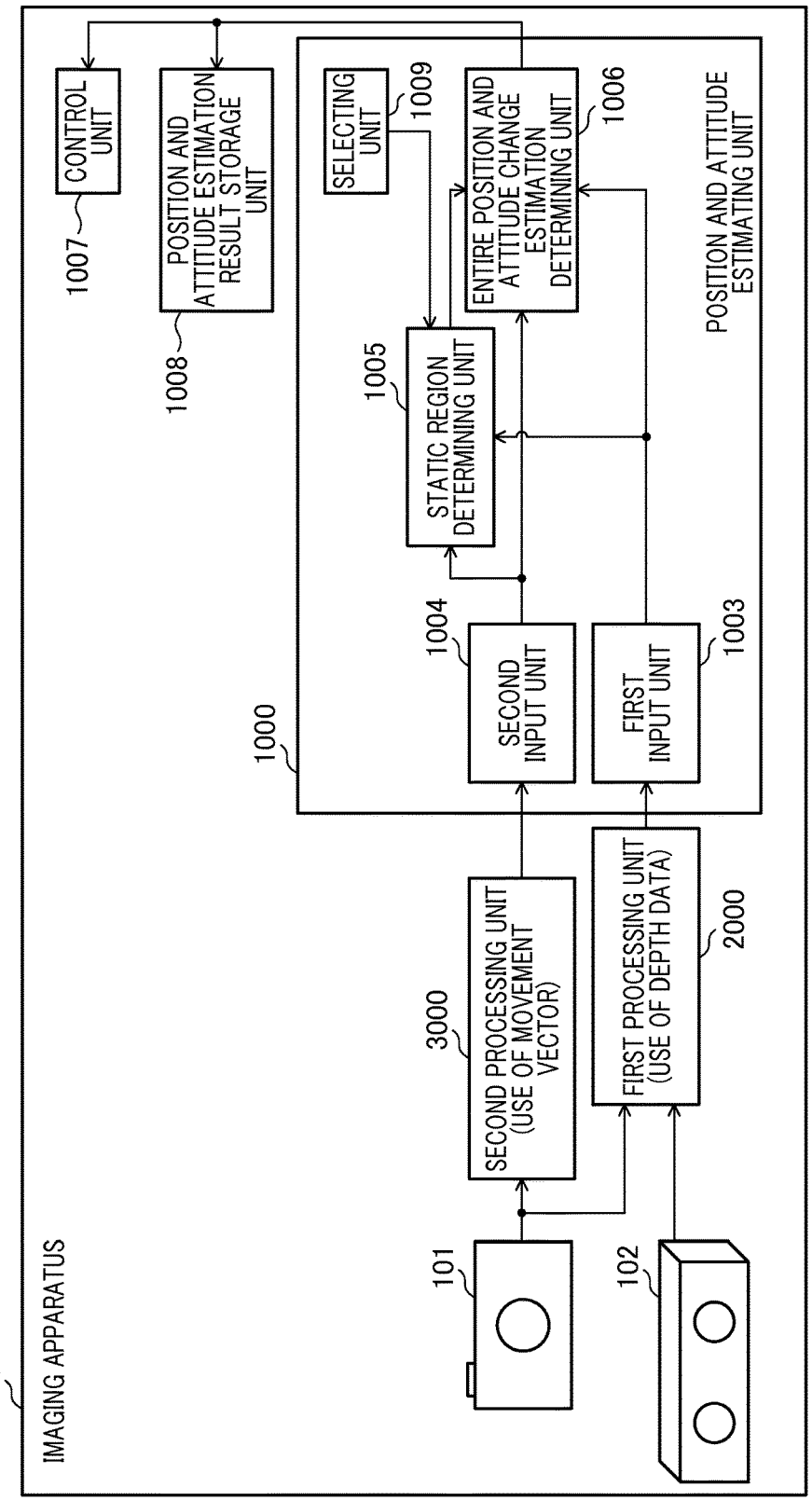
FIG. 14 is a block diagram illustrating an entire configuration of an apparatus in order to explain a second embodiment of the present invention in conjunction with FIGS. 15 to 22.

FIG. 14 is a block diagram illustrating an example of a configuration of an imaging apparatus according to the second embodiment. The imaging apparatus 10 includes an image acquiring device 101 and a depth image acquiring device 102.

The image acquiring device 101 is a unit configured to acquire two-dimensional image data by capturing an object. Image data obtained by the image acquiring device 101 is output to a first processing unit 2000 and a second processing unit 3000. In the present embodiment, the first processing unit 2000 configured to use depth data and the second processing unit 3000 configured to use a motion vector are employed. Motion of an image is the trajectory of motion vectors, corresponding points, or points-of-interest. In the present embodiment, a motion vector is illustrated.

The depth image acquiring device 102 is a device that detects depth data and is connected to the first processing unit 2000. In the present embodiment, a description will be given of depth data as, for example, a depth image having depth data for each pixel. The depth image acquiring device 102 has, for example, an infrared ray irradiating unit and an infrared ray reading unit. The infrared ray irradiating unit irradiates an object with an infrared ray of the predetermined pattern, and the infrared ray reading unit reads the infrared ray reflected from the object. In this manner, a depth image is captured by reading the distortion of the pattern. Note that a depth image may also be generated by other methods. For example, a Time of flight method for capturing a depth image by measuring a time taken for read out after irradiation of an infrared ray or a method for generating a depth image by determining parallax of a plurality of images captured by a multi-eye lens may also be employed. Any method may be employed as long as a depth image can be generated thereby.

The first processing unit 2000 acquires image data obtained from the image acquiring device 101 and depth image data obtained from the depth image acquiring device 102 to estimate a background region candidate and a position and attitude change. The first processing unit 2000 outputs the estimation result of the background region candidate and the estimation result of the position and attitude change with use of depth data to a position and attitude estimating unit 1000.

The second processing unit 3000 detects a motion vector using image data captured by the image acquiring device 101 to estimate a background region candidate and a position and attitude change. The second processing unit 3000 outputs the estimation result of the background region candidate and the estimation result of the position and attitude change with use of a motion vector to the position and attitude estimating unit 1000.

The position and attitude estimating unit 1000 includes a first input unit 1003, a second input unit 1004, a static region determining unit 1005, an entire position and attitude change estimation determining unit 1006, and a selecting unit 1009.

The first input unit 1003 to which the estimation results of the background region candidate and the position and attitude change with use of depth data is input is connected to the first processing unit 2000. The first computation result of the background region candidate and the position and attitude change (hereinafter referred to as "first computation result") which has been estimated by the first processing unit 2000 using depth data is output from the first input unit 1003 to the static region determining unit 1005 and the estimation determining unit 1006. The second input unit 1004 to which the estimation results of the background region candidate and the position and attitude change with use of a motion vector is input is connected to the second processing unit 3000. The second computation result of the background region candidate and the position and attitude change (hereinafter referred to as "second computation result") which has been estimated by the second processing unit 3000 using a motion vector is output from the second input unit 1004 to the static region determining unit 1005 and the estimation determining unit 1006.

The static region determining unit 1005 acquires the first and the second computation results and then determines a static region in an image based on these pieces of information. Information about the determined static region is output to the estimation determining unit 1006. The estimation determining unit 1006 determines a position and attitude change of the whole image using the first computation result, the second computation result, and information about the static region determined by the static region determining unit 1005. A position and attitude estimation result storage unit 1008 (hereinafter simply referred to as "storage unit") stores the estimation result of the position and attitude change. The storage unit 1008 is connected to the estimation determining unit 1006 and stores the estimation result of the position and attitude change determined by the estimation determining unit 1006 as the past computation result. The past computation result may also be used upon determining a static region. The static region may also be determined by the selecting unit 1009 connected to the static region determining unit 1005 in accordance with the judgment criteria selected by a user operation. The selecting unit 1009 includes an operation unit for selecting the judgment criteria for a static region depending on a user operation and a display unit such as a setting screen or the like.

The control unit 1007 of the imaging apparatus 10 includes a CPU (Central Processing Unit) and acquires the position and attitude change data of the whole image determined by the estimation determining unit 1006 to calculate an image shake correction amount. The basic function of the control unit 1007 is the same as that of the control unit 110 shown in FIG. 1.

Figure 15:
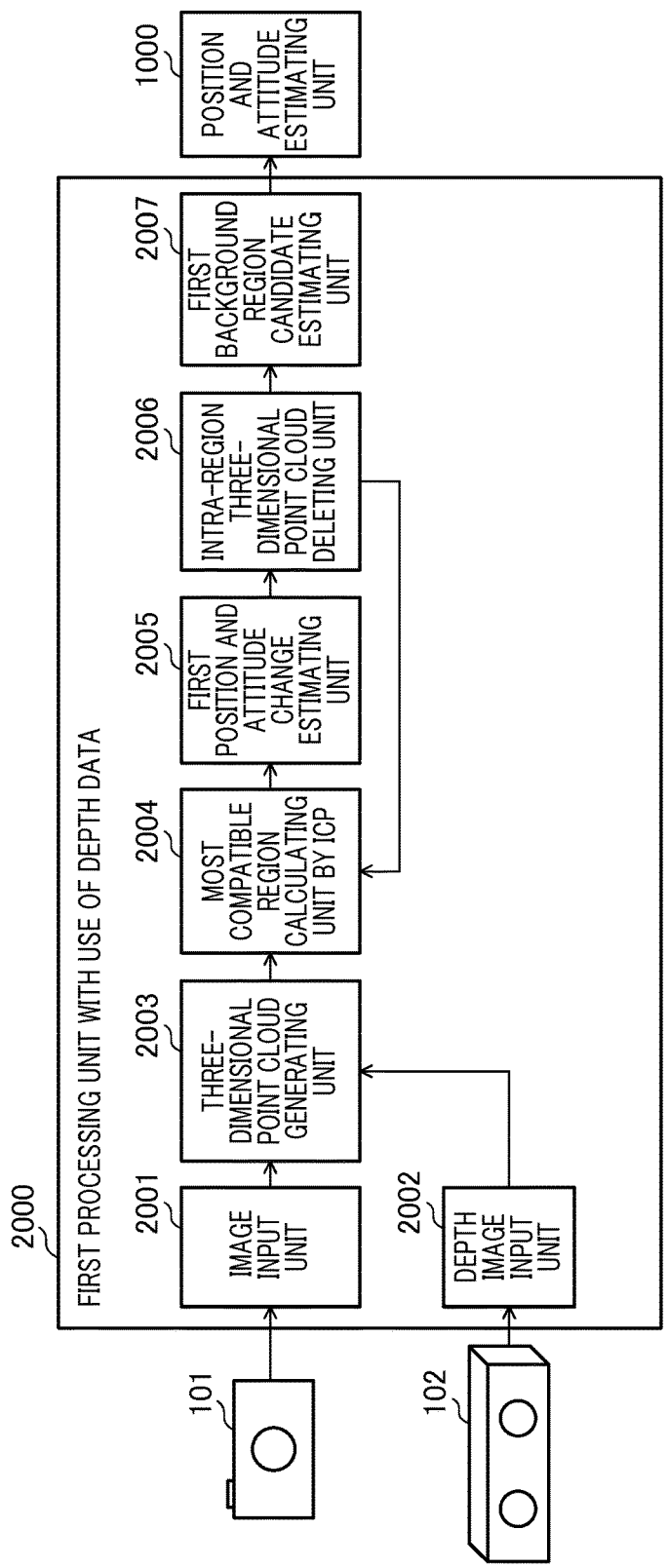
FIG. 15 is a block diagram illustrating a configuration of a depth data processing unit.

Next, a description will be given of a configuration of the first processing unit 2000 with reference to the block diagram shown in FIG. 15.

Image data obtained from the image acquiring device 101 is input to an image input unit 2001, and depth image data obtained from the depth image acquiring device 102 is input to a depth image input unit 2002. A three-dimensional point cloud generating unit 2003 acquires image data and depth image data from the image input unit 2001 and the depth image input unit 2002, respectively, to generate a three-dimensional point cloud to be described below. The three-dimensional point cloud data is output to a most compatible region calculating unit 2004 by ICP. The most compatible region calculating unit 2004 performs segmentation processing for the three-dimensional point cloud generated by the three-dimensional point cloud generating unit 2003 for each region using ICP algorithm. The processing result is output to a first position and attitude change estimating unit 2005.

The first position and attitude change estimating unit 2005 calculates a position and attitude change corresponding to the region calculated by the most compatible region calculating unit 2004, and then estimates the position and attitude change as the position and attitude change of the region. The estimation result is output to a three-dimensional point cloud deleting unit 2006. The deleting unit 2006 deletes the three-dimensional point cloud in the region calculated by the most compatible region calculating unit 2004, and then outputs the processing result to a first background region candidate estimating unit 2007. The first background region candidate estimating unit 2007 selects the region set based on the estimation result of the same position and attitude change including at least the rearmost depth as the background region candidate based on the estimation result of the position and attitude change for each depth estimated by the first position and attitude change estimating unit 2005. The background region candidate selected as the first estimation processing result is output as the first computation result to the position and attitude estimating unit 1000. In other words, the first background region candidate estimating unit 2007 is connected to the position and attitude estimating unit 1000, and the first computation result is transmitted to the first input unit 1003.

Figure 16:
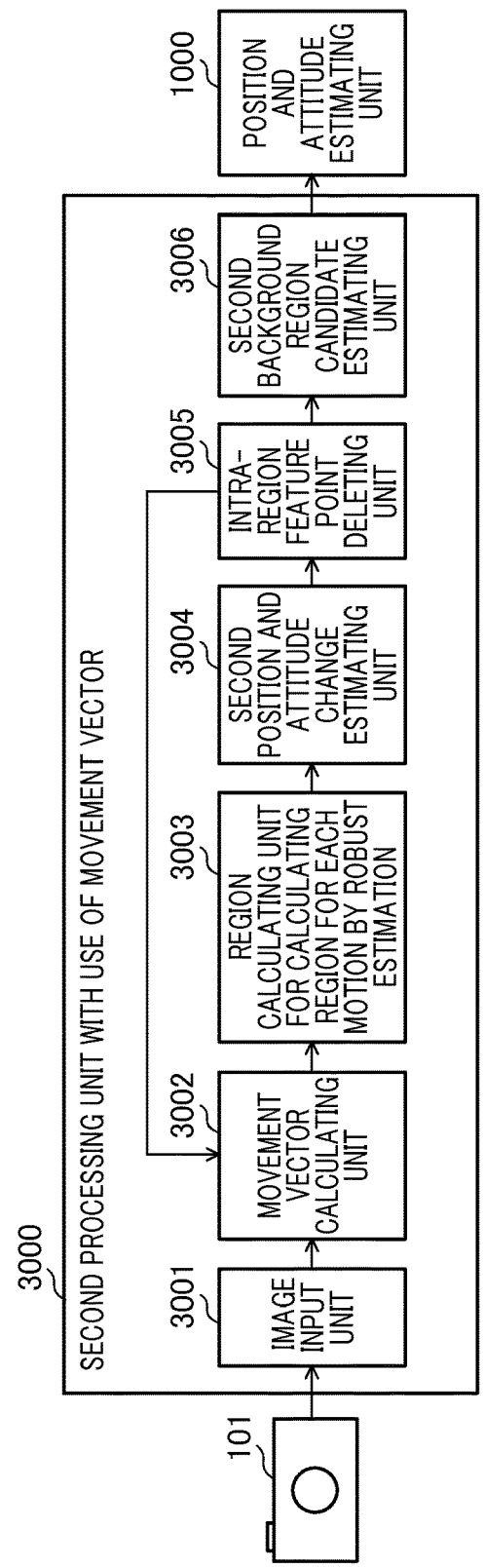
FIG. 16 is a block diagram illustrating a configuration of a motion vector processing unit.

Next, a description will be given of a configuration of the second processing unit 3000 with use of a motion vector with reference to FIG. 16.

An image input unit 3001 is connected to the image acquiring device 101. Image data captured by the image acquiring device 101 is input to the image input unit 3001. A motion vector calculating unit 3002 calculates a motion vector between images by comparing reference frame image data and non-reference frame image data, both of which are input from the image input unit 3001, and outputs the motion vector to a region calculating unit 3003. The region calculating unit 3003 calculates the motion vector in a region for each motion using information about the motion vector calculated by the motion vector calculating unit 3002 by robust estimation.

A second position and attitude change estimating unit 3004 estimates a position and attitude change by acquiring the motion vector for each region calculated by the region calculating unit 3003 and then outputs the estimation result to a deleting unit 3005 configured to delete a feature point in a region. The deleting unit 305 outputs the processing result obtained by deleting a feature point in the region calculated by the region calculating unit 3003 to a second background region candidate estimating unit 3006. The second background region candidate estimating unit 3006 selects the region which is estimated as a background from a texture or the like as the background region candidate from among the position and attitude changes in the regions for each motion estimated by the second position and attitude change estimating unit 3004. The background region candidate selected as the second estimation processing result is the second computation result. The output of the second background region candidate estimating unit 3006 is input to the position and attitude estimating unit 1000 via the second input unit 1004.

Figure 17:
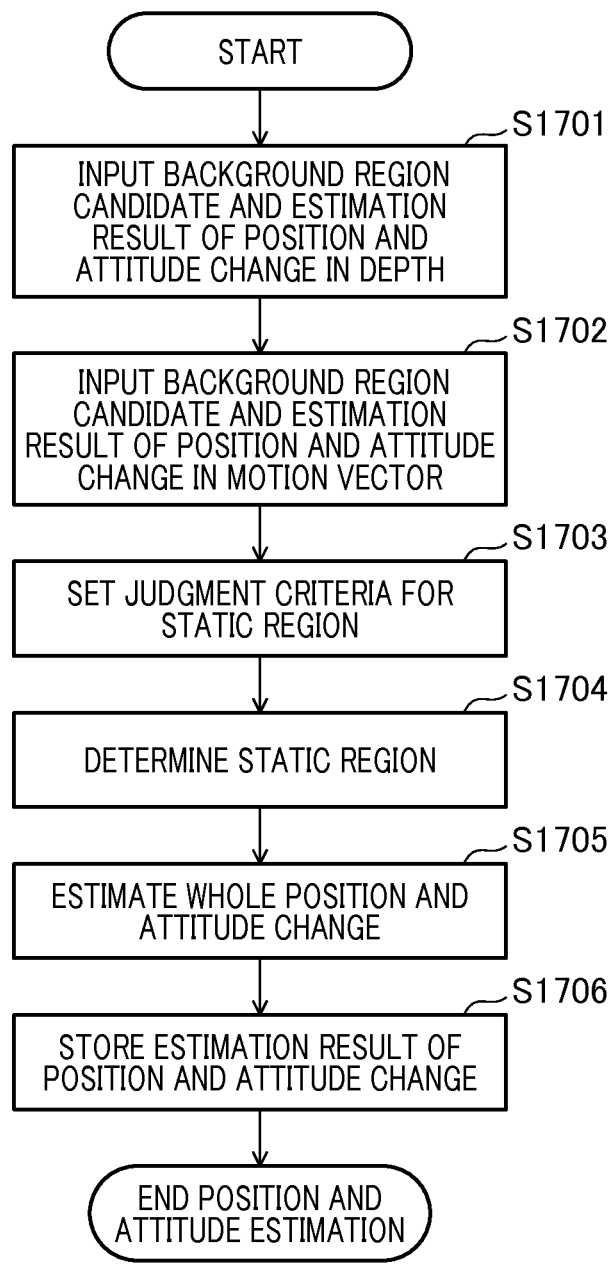
FIG. 17 is a flowchart illustrating the entire operation.

Next, a detailed description will be given of an operation performed by the imaging apparatus 10 with reference to the flowchart shown in FIG. 17. In the present embodiment, in the case of a moving image, position and attitude change estimation processing is performed between continuous frames along the time-axis direction. While it is assumed that the reference frame and the non-reference frame are associated with each other in the time-axis direction, the reference frame and the non-reference frame may not necessarily be adjacent frames. The following processing is repeated until the processing is completed for each frame as the reference frame. Alternatively, a frame may be set as one to be processed as the reference frame in accordance with a user operation.

In step S1701, image data obtained by the image acquiring device 101 and depth image data obtained by the depth image acquiring device 102 are input to the first processing unit 2000. The first processing unit 2000 calculates the first computation result and then outputs it to the first input unit 1003. The processing performed by the first processing unit 2000 will be described below in detail with reference to the flowchart shown in FIG. 18.

In step S1702, image data obtained by the image acquiring device 101 is input to the second processing unit 3000. The second processing unit 3000 calculates the second computation result and then outputs it to the second input unit 1004. The processing performed by the second processing unit 3000 will be described below in detail with reference to the flowchart shown in FIG. 19.

In step S1703, the static region determining unit 1005 sets the judgment criteria for determining a static region based on the first computation result input in step S1701 and the second computation result input in step S1702. In step S1704, the static region determining unit 1005 determines a static region from the first computation result input in step S1701 and the second computation result input in step S1702 based on the judgment criteria for the static region set in step S1703. The processing performed by the static region determining unit 1005 will be described below in detail with reference to the flowchart shown in FIG. 21.

In step S1705, the entire position and attitude change estimation determining unit 1006 estimates the entire position and attitude change from the first computation result input in step S1701 and the second computation result input in step S1702 based on the static region determined in step S1704. In step S1706, processing for storing the estimation result estimated in step S1705, i.e., the first computation result data or the second computation result data in the storage unit 1008 is executed. As in the first embodiment, integration processing is performed for the data stored in the storage unit 1008, and the integrated data is used for image shake correction or the like.

Figure 18:
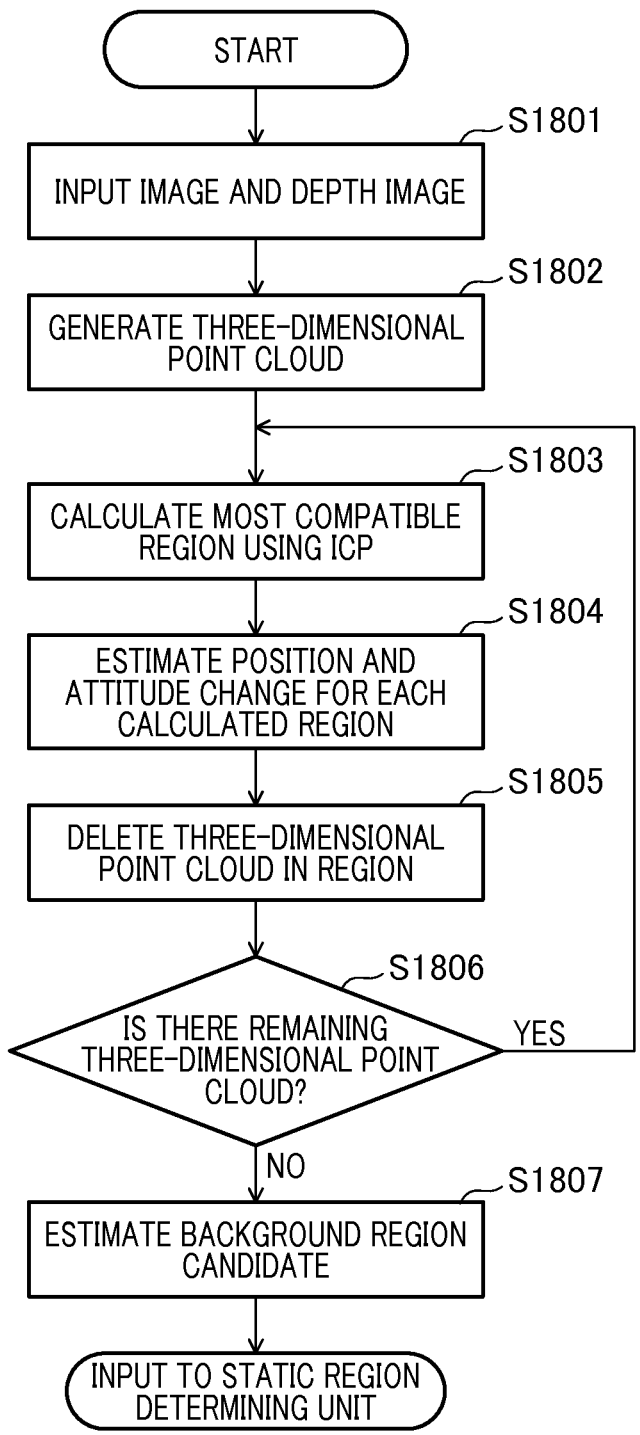
FIG. 18 is a flowchart illustrating an operation performed by the depth data processing unit.

Next, a description will be given of the processing in step S1701 shown in FIG. 17 with reference to FIG. 18. In step S1801, data to be used for the position and attitude change estimation processing is input. More specifically, image capturing by the image acquiring device 101 and depth image capturing by the depth image acquiring device 102 are simultaneously performed. Image data is input to the first processing unit 2000 via the image input unit 2001 and depth image data is input to the first processing unit 2000 via the depth image input unit 2002. In step S1802, the three-dimensional point cloud generating unit 2003 acquires the image data and the depth image data input in step S1801 to generate a three-dimensional point cloud. In the present embodiment, the term "three-dimensional point cloud" refers to a set of points having at least pixel (color/gradient) information and positional information on the three-dimensional coordinate. The pixels of an image can be mapped on the three-dimensional coordinate using a depth image to generate a three-dimensional point cloud. Information about points may include information about the normal or the like. The reason why a three-dimensional point cloud is generated is to determine the positional and attitude relationship between the object to be captured and the imaging apparatus 10 in the three-dimensional space based on two-dimensional image data and two-dimensional depth image data.

In step S1803, the most compatible region calculating unit 2004 performs region segmentation for the three-dimensional point cloud generated in step S1802 using ICP. In the region segmentation processing, the registration and the most compatible three-dimensional point cloud for the three-dimensional point cloud of the non-reference frame with respect to three-dimensional point cloud of the reference frame is calculated by ICP.

In step S1804, the first position and attitude change estimating unit 2005 sets the estimation results of the position and attitude changes corresponding to the regions segmented in step S1803 as the position and attitude changes of the three-dimensional point cloud to which the change is adapted. In step S1805, the deleting unit 2006 deletes a three-dimensional point cloud in the region calculated in step S1803. In step S1806, the deleting unit 2006 judges whether or not there are remaining three-dimensional point cloud points outside the region calculated in step S1803. If there are remaining three-dimensional point cloud points outside the region, the processing returns to step S1803. In step S1805, mapping is performed again at the three-dimensional point cloud points which have not been deleted, and thus, the region is calculated using the remaining three-dimensional point clouds. By stepwisely calculating a region as described above, a plurality of regions having a different position and attitude change can be calculated. If it is judged in step S1806 that there is no remaining three-dimensional point cloud point outside the region, the processing proceeds to step S1807.

In step S1807, the first background region candidate estimating unit 2007 selects the region including at least the rearmost depth as the background region candidate from among the regions segmented in step S1803, and the first processing with use of depth data is ended. Any region segmentation method may be employed as long as the depth of a region of different objects to be captured can be segmented. For example, the depth may be segmented such that the number of points in the point cloud becomes equal for each of segmented regions or the depth may also be evenly segmented regardless of objects to be captured. While, in the present embodiment, a description has been given by taking an example of ICP algorithm, any method may also be employed as long as a position and attitude change between image frames can be estimated. For example, while, in the present embodiment, estimation processing is performed by using all the points within a frame, the number of points may also be reduced by random sampling or sampling at regular intervals. While, in the present embodiment, a description has been given by taking an example in which two points which are closest to each other between frames are corresponding points, a method for searching better corresponding points using information about color, normal, or the like of points may also be employed.

Next, a detailed description will be given of the second processing unit 3000 with reference to the flowchart shown in FIG. 19. The processing from step S1901 to step S1906 is the same as that from step S701 to step S706 shown in FIG. 11 described in the first embodiment and detailed description thereof will be omitted. Reference numerals 300, 301, 302, 303, 304, and 305 of the components in the block diagram shown in FIG. 3 respectively correspond to reference numerals 3000, 3001, 3002, 3003, 3004, and 3005 of the components in the block diagram shown in FIG. 16.

In step S1907, the deleting unit 3005 judges whether or not there are remaining feature points outside the motion region calculated in step S1904. If there are remaining feature points outside the motion region, the processing returns to step S1902. In step S1906, mapping is performed again at the feature points which have not been deleted, and thus, the motion vector and the region for each motion using the remaining region are calculated. By stepwisely calculating a region for each motion, a plurality of motions can be calculated. If it is judged in step S1907 that there is no remaining feature point outside the motion region, the processing proceeds to step S1908. In step S1908, the second background region candidate estimating unit 3006 estimates the background region candidate from among the regions for each motion calculated in step S1904 using the background region candidate estimation method with use of an image, and then, the second processing with use of a motion vector is ended.

Hereinafter, a specific description will be given of the background region candidate estimation method with use of an image. In the present embodiment, general object recognition is used for estimating a background region candidate by using the specific object recognition technique. More specifically, a background region candidate is estimated by using texture recognition. Firstly, a description will be given of prior preparation.

Firstly, the processing for learning a background texture is executed. As a background texture, a texture such as artifacts including buildings, roads, and the like, sea, mountains, sky, forests, and the like is learned in advance. Next, for the learned texture, the processing for extracting a local feature amount from an image is executed by using a local feature amount extractor, e.g., SIFT (Scale Invariant Feature Transform). Finally, texture model database is configured by the extracted local feature amount.

Figure 20A:
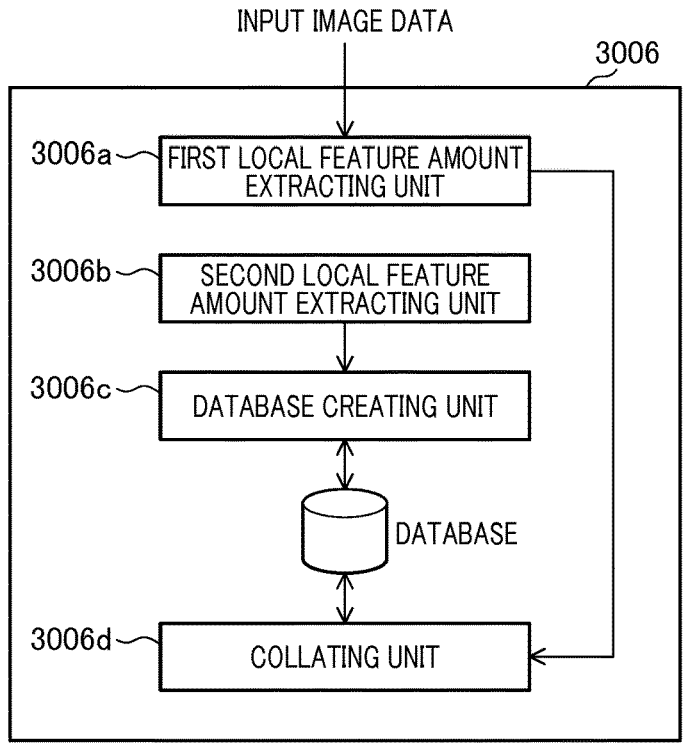
FIGS. 20A and 20B are diagrams illustrating background region candidate estimation processing using an image.
Figure 20B:
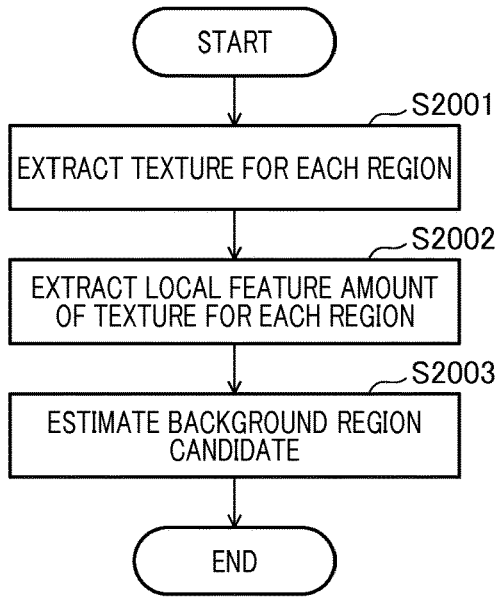

A description will be given of a configuration of the second background region candidate estimating unit 3006 with reference to FIG. 20A. In the present embodiment, the first extraction processing and the second extraction processing for extracting a local feature amount from an image is performed. A first local feature amount extracting unit 3006a extracts a local feature amount from input image data and then outputs the local feature amount to a collating unit 3006d. A second local feature amount extracting unit 3006b extracts a local feature amount from image data of the previously-learned image and then output the local feature amount to a database creating unit 3006c. The database creating unit 3006c creates database from the local feature amount extracted by the second local feature amount extracting unit 3006b. The collating unit 3006d acquires the local feature amount extracted by the first local feature amount extracting unit 3006a and then collates the local feature amount with the database created by the database creating unit 3006c. In this manner, the background region candidate estimation processing is performed by using texture recognition. A description will be given of an example of processing with reference to the flowchart shown in FIG. 20B.

Figure 19:
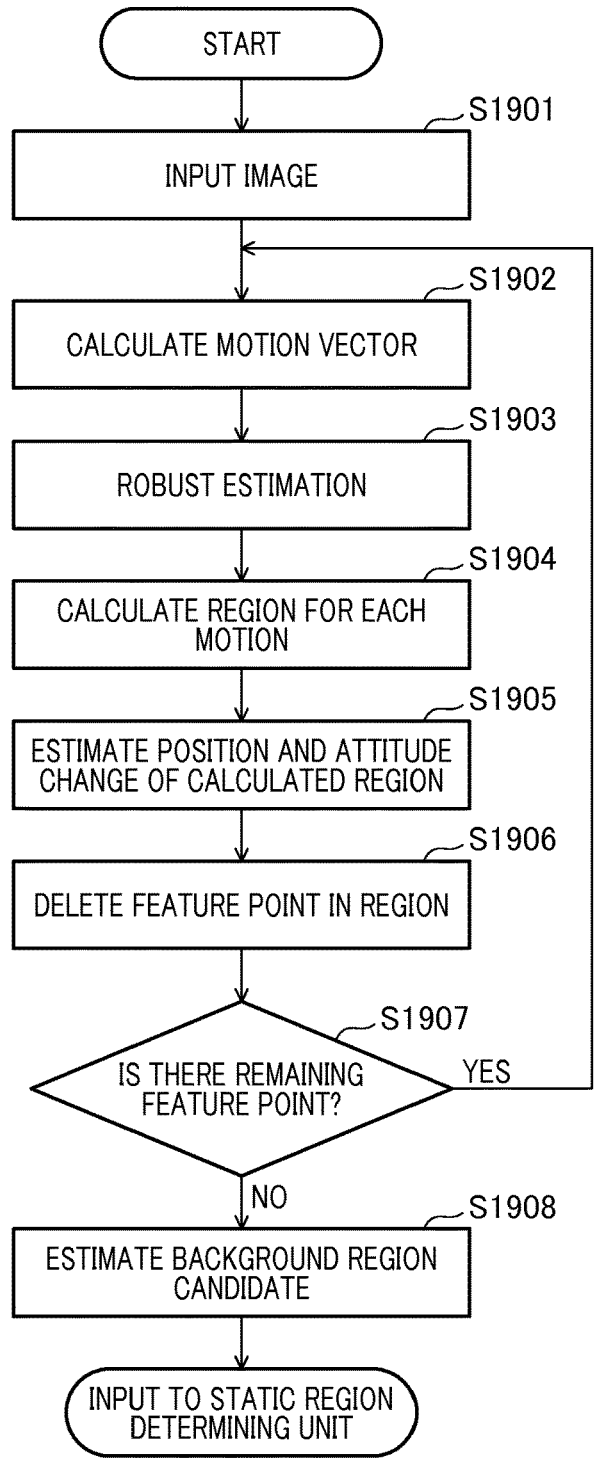
FIG. 19 is a flowchart illustrating an operation performed by the motion vector processing unit.

In step S2001, the first local feature amount extracting unit 3006a extracts a texture from the region for each motion calculated in step S1904 shown in FIG. 19. In step S2002, the processing for extracting a local feature amount from the texture extracted in step S2001 is executed as in the case of prior learning. In step S2003, nearest neighbor search processing is executed between the database configured by prior preparation and the local feature amount extracted in step S2002. The processing is performed by the collating unit 3006d. If there is a candidate having the degree of coincident exceeding a threshold value, the search result is estimated as a background region candidate.

While, in the above description, a description has been given by taking an example in which a local feature amount is extracted by using SIFT, the present invention is not limited to the method but Bag-Of-Words (BOW) or Histograms of Oriented Gradients (HOG) may also be used. In order to increase the speed of the nearest neighbor search, indexing processing may also be performed by kd-tree or Locality Sensitive Hashing (LSH). In order to increase the speed of collation, a similar feature may be reduced by pruning and a feature dimension may be optimized by singular value resolution so as to compact database. While, in the present embodiment, a description has been given of an exemplary specific object recognition technique, any method may also be employed as long as the background region or the static region can be estimated from an image.

Figure 21:
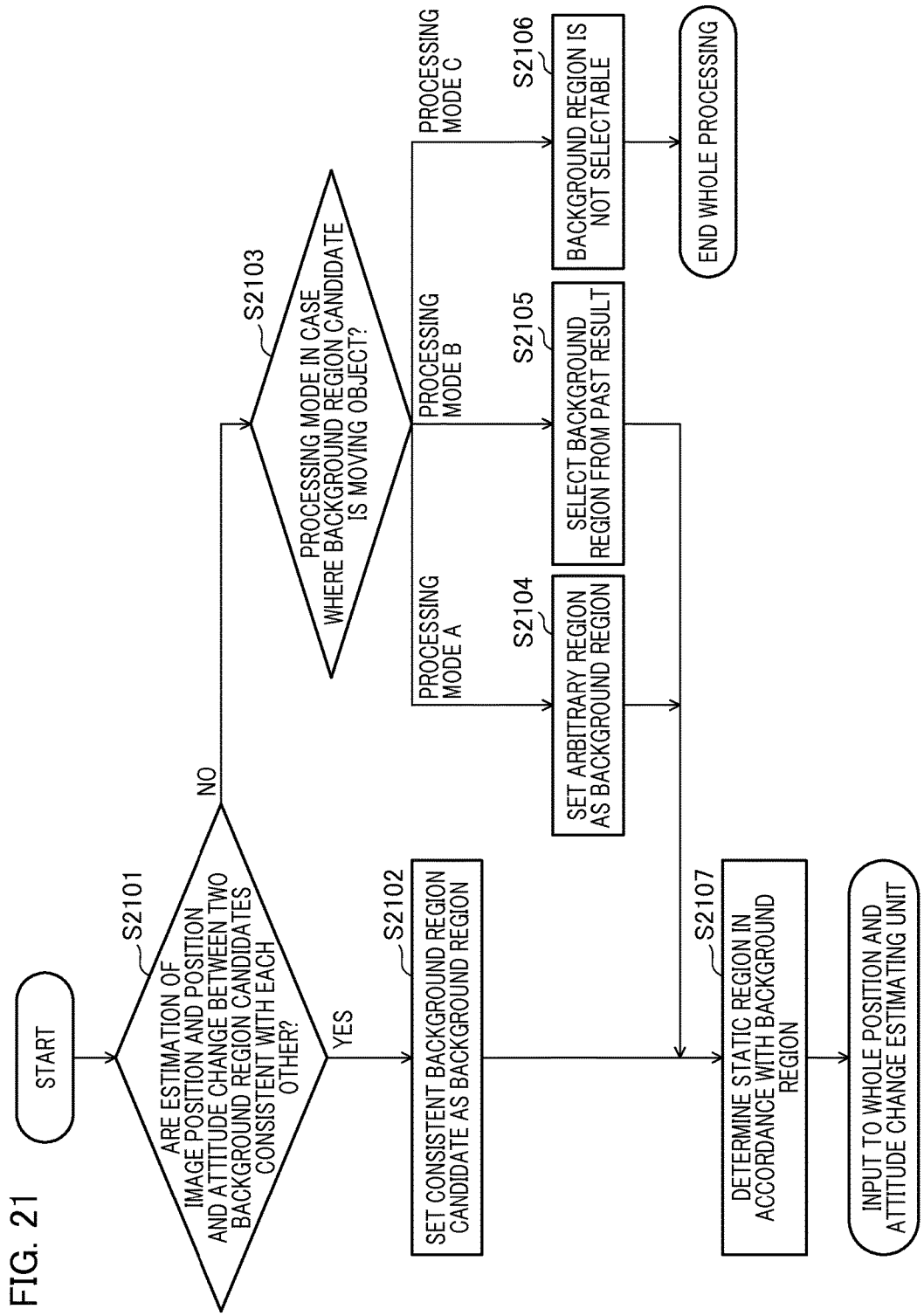
FIG. 21 is a flowchart illustrating an operation performed by a static region determining unit.

Next, a detailed description will be given of the processing executed by the static region determining unit 1005 with reference to the flowchart shown in FIG. 21. In step S2101, the static region determining unit 1005 compares first background region candidate data and first position and attitude change estimation data with second background region candidate data and second position and attitude change estimation data, respectively, as to whether or not both data are consistent with each other. More specifically, for the comparison of the background region candidates, when the deviation of the center of gravity coordinates in the regions is less than a threshold value or when the difference in size of the regions is less than a threshold value, it is judged that two background region candidates are consistent with each other. For the comparison of the position and attitude change estimation data, when the translational vectors of position and attitude changes have the identical orientation (sign), the difference in size of the translational vectors is less than a threshold value, and the size of the rotation angle of rotational movement is less than a threshold value, it is judged that two position and attitude change estimation data are consistent with each other. If it is judged that two background region candidates (first and second background region candidates) and two position and attitude change estimation data are consistent with each other as a result of comparison, the processing proceeds to step S2102, whereas if it is judged that both are inconsistent with each other, the processing shifts to step S2103.

In step S2102, the first background region candidate or the second background region candidate is determined as the background region. Then, the processing proceeds to step S2107.

In step S2103, the processing for checking a processing mode in the case where the background region candidate is a moving object is performed. In the checking processing, any one of the following processing modes is judged and then the background region is determined in accordance with the processing mode based on the predetermined judgment criteria.

In the case of the first processing mode A (see step S2104), the static region determining unit 1005 determines an arbitrary region as a background region. For example, the region which is the next rearmost to the first background region candidate input by the first input unit 1003 is updated as the first background region candidate, so that the updated first background region candidate can be consistent with the second background region candidate input by the second input unit 1004. Furthermore, the update processing for updating the first background region candidate may continue until a consistency between both background region candidates can be achieved. Alternatively, the user may freely specify an arbitrary region in an image as a background region by an operation using the selecting unit 1009.

In the case of the second processing mode B (see step S2105), the static region determining unit 1005 determines a static region from the first background region candidate and the second background region candidate using past data (static region and position and attitude change data) stored in the storage unit 1008. More specifically, the processing for setting a region related to the estimation result which has a smaller difference from the past computation result than the other estimation result as a static region is performed. For example, assume the case where moving image capturing is performed at a frame rate of 60 fps (frames per second). The time interval between the estimation result of the current position and attitude change and the past computation result is short, e.g., 1/60 seconds. It is highly probable that, in the position and attitude change of the static region, the center of gravity coordinates of the region, and the size of the region, the current computation result is very close to the past computation result even if an image shake occurs. Thus, a region related to the estimation result which is close to the past computation result is set as a background region.

In the case of the third processing mode C (see step S2106), the static region determining unit 1005 determines that a background region cannot be selected and then ends the whole processing.

After step S2102, step S2104, or step S2105, the processing proceeds to step S2107. In step S2107, the static region is determined based on the background region determined by the processing in step S2102, step S2104, or step S2105. The static region determining unit 1005 outputs the determined static region to the estimation determining unit 1006. Note that the background region may also be determined by using the estimation result of the position and attitude change between the preceding frames or a forecast value calculated from the estimation result.

Figure 22A:
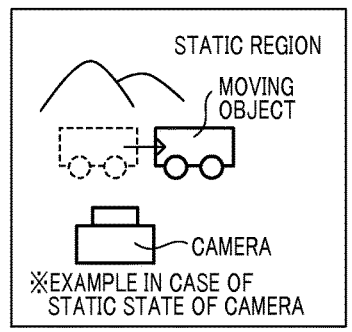
FIGS. 22A to 22F are diagrams illustrating estimation of a position and attitude change based on a static region and estimation of a position and attitude change based on a dynamic region.
Figure 22B:
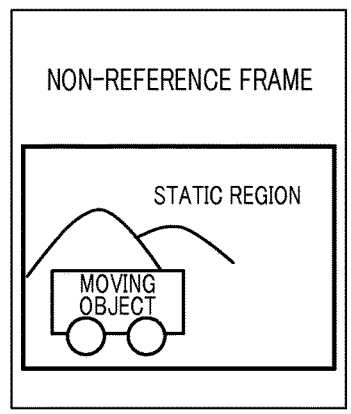
Figure 22C:
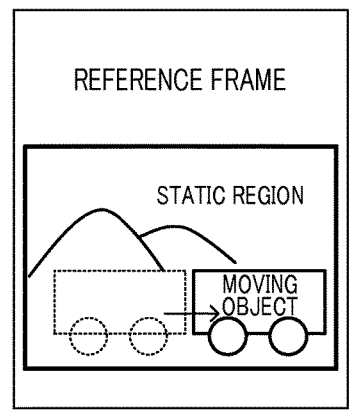

Next, a description will be given of the effects of the present embodiment with reference to FIG. 22. FIG. 22A illustrates the situation where a scene in which there is a dynamic region on the front side with respect to a static region which lies deep in the depth of field is captured by a camera. Here, an image is captured with the camera fixed for ease of explanation. FIG. 22B illustrates a non-reference frame image and FIG. 22C illustrates a reference frame image. Two frames shown in FIGS. 22B and 22C are consecutive in time, and the frame shown in FIG. 22B is the past frame as compared with that shown in FIG. 22C.

Figure 22D:
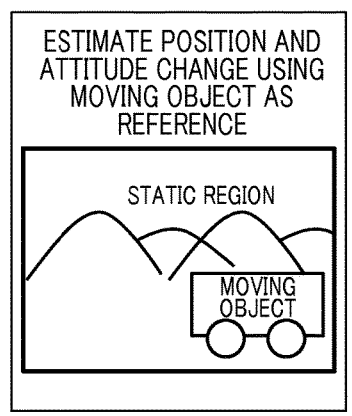
Figure 22E:
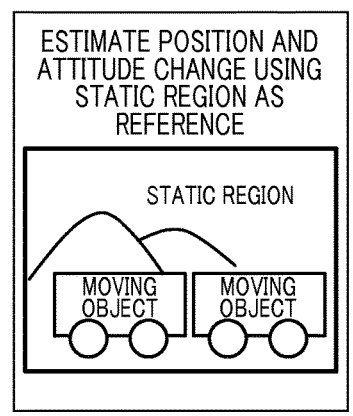
Figure 22F:
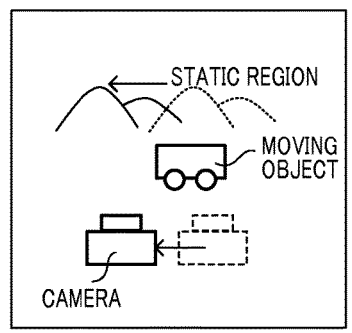

When the position and attitude change is estimated while focusing on a moving object in each image shown in FIG. 22B and FIG. 22C, the estimation result is readily affected by the dynamic region as shown in FIG. 22D. For example, a phenomenon in which the moving object is stopped and the static region and the motion of the camera are artificially moved in a direction opposite to the original motion, resulting in a change in position and attitude as shown in FIG. 22F. In contrast, FIG. 22E illustrates an example of an image obtained when the position and attitude change is estimated by using the static region as a reference. The position and attitude change is estimated by using the pre-estimated static region as a reference, so that the position and attitude change which is hardly affected by the dynamic region can be estimated. The static region is often artifacts including buildings, sea, mountains, forests, sky, and the like. These may often be located as a background at the rearmost in an image. In the present embodiment, a static region is estimated using depth information by determining the region having the rearmost depth as a background region. However, the possibility of the case where the region having the rearmost depth is a moving object cannot be excluded in the method. Accordingly, the background region estimation method with use of image information is used together with the background region estimation method with use of depth information, so that estimation accuracy can be improved by ensuring the consistency between two processing methods. Unnatural correction affected by the dynamic region may be made by the conventional image shake correction (anti-vibration control) of the imaging apparatus. In contrast, in the present embodiment, image shake correction which is hardly affected by the dynamic region can be realized.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-238880, filed on Nov. 19, 2013, Japanese Patent Application No. 2013-238881, filed on Nov. 19, 2013, and Japanese Patent Application No. 2014-040522, filed on Mar. 3, 2014, which are hereby incorporated by reference herein in their entirety.

What is claimed is:

1. An image processing device comprising:
   one or more processors; and
   a memory storing instructions which, when executed by the one or more processors, cause the image processing device to function as:

an acquisition unit configured to acquire a plurality of image data and a plurality of depth data corresponding to the plurality of image data, respectively;

a calculating unit configured to calculate first position and attitude changes for each depth from the plurality of image data and the plurality of depth data;

a grouping unit configured to calculate a frequency distribution of depths corresponding to the first position and attitude changes from each of the plurality of depth data, and group the plurality of depth data in a plurality of groups based on the frequency distribution;

a detection unit configured to detect motions in the plurality of image data;

a region calculating unit configured to estimate regions, which have a same motion;

a processing unit configured to calculate second position and attitude changes of the regions for each motion; and a determining unit configured to determine a position and attitude change of a whole image for the plurality of image data by determining a static region based on data of the first position and attitude changes which respectively correspond to the plurality of groups obtained by the grouping unit and data of the second position and attitude changes.

2. The image processing device according to claim 1, wherein the calculating unit compares a reference frame obtained by segmenting the plurality of depth data with a non-reference frame obtained by not segmenting the plurality of depth data so as to calculate the first position and attitude changes for each depth.

3. The image processing device according to claim 1, wherein, when the determining unit determines a region in which a region occupied by an object image is a greatest region as the static region, the determining unit determines the position and attitude change of the whole image based on the data of the second position and attitude changes.

4. The image processing device according to claim 1, wherein, when the determining unit determines a region in which a proportion occupied by depth in the data of the frequency distribution is a greatest as the static region, the determining unit determines the position and attitude change of the whole image based on the data of the first position and attitude changes.

5. The image processing device according to claim 1, wherein the instructions stored in the memory cause the image processing device to function as:
a selecting unit configured to select judgment criteria of the static region in accordance with an operation,
wherein the determining unit determines the static region in accordance with the judgment criteria selected by the selecting unit.

6. The image processing device according to claim 1, wherein the processing unit selects a position and attitude change corresponding to a region of which a proportion to the whole image is greatest from among the regions for each motion.

7. The image processing device according to claim 1, wherein, when a difference between the data of the first position and attitude changes and the data of the second position and attitude changes is less than a threshold value, the determining unit determines the position and attitude change of the whole image by performing a weighting computation.

8. The image processing device according to claim 1, wherein the instructions stored in the memory cause the image processing device to function as:
a storage unit configured to store the data of the position and attitude change of the whole image determined by the determining unit,
wherein, when a difference between the data of the first position and attitude changes and the data of the second position and attitude changes exceeds a threshold value, the determining unit reads data stored in the storage unit and then determines either the data of the first position and attitude changes or the data of the second position and attitude changes with a smaller difference from a position and attitude change indicated by the read data as the data of the position and attitude change of the whole image.

9. The image processing device according to claim 8, wherein, when the data of the first position and attitude changes is different from the data of the second position and attitude changes and no data of the position and attitude change is stored in the storage unit, the determining unit does not use both the data of the first position and attitude changes and the data of the second position and attitude changes as the data of the position and attitude change of the whole image.

10. The image processing device according to claim 1, wherein the calculating unit calculates depth data of the same position and attitude change including at least the rearmost depth from the plurality of depth data, and the determining unit estimates a first background region candidate from the plurality of depth data of the same position and attitude change including the rearmost depth.

11. The image processing device according to claim 10, wherein the processing unit comprises a second estimating unit configured to estimate a second background region candidate for the regions for each motion.

12. The image processing device according to claim 11, wherein the second estimating unit comprises:
a first extracting unit configured to extract a local feature amount from the plurality of image data;
a second extracting unit configured to extract a local feature amount from image data of a previously-learned image;
a database creating unit configured to create database from the local feature amount extracted by the second extracting unit; and
a collating unit configured to collate the local feature amount extracted by the first extracting unit with data in the database,
wherein the collating unit estimates the second background region candidate.

13. The image processing device according to claim 11, wherein the determining unit determines a background region based on the first background region candidate, the data of the first position and attitude changes, the second background region candidate, and the data of the second position and attitude changes and then determines the static region based on the background region.

14. The image processing device according to claim 13, wherein the determining unit determines the position and attitude change of the whole image based on the static region determined from the background region by the determining unit, the data of the first position and attitude changes, and the data of the second position and attitude changes.

15. The image processing device according to claim 1, wherein a motion of the image data is a trajectory of motion vectors or corresponding points or points-of-interest.

16. The image processing device according to claim 1, wherein the determining unit selects a group having a greatest proportion occupied by depth from a plurality of groups obtained by the grouping unit and then determines the data of the position and attitude change corresponding to the group as data of the position and attitude change of the whole image.

17. The image processing device according to claim 16, wherein the instructions stored in the memory cause the image processing device to function as:
a storage unit configured to store the data of the position and attitude change of the whole image determined by the determining unit, and
wherein, when a group having a greatest proportion is present in plural, the determining unit reads data stored in the storage unit and then determines data of the position and attitude change with a smallest difference from the position and attitude change indicated by the read data as the data of the position and attitude change of the whole image.

18. The image processing device according to claim 16, wherein the instructions stored in the memory cause the image processing device to function as a selecting unit configured to select any one of the plurality of groups obtained by the grouping unit, and
wherein, when a group having the greatest proportion is present in plural, the determining unit determines data of the position and attitude change corresponding to the group selected from the plurality of groups by the selecting unit as the data of the position and attitude change of the whole image.

19. The image processing device according to claim 16, wherein, when a group having the greatest proportion is present in plural, the determining unit does not determine the position and attitude change of the whole image for a reference frame obtained by segmenting the plurality of depth data.

20. An imaging apparatus comprising:
one or more first processors;
a first memory storing instructions which, when the instructions are executed by the one or more first processors, cause the imaging apparatus to function as:
an image acquiring unit configured to acquire a plurality of image data imaged by an imaging optical system and an imaging element;
a depth image acquiring unit configured to acquire a plurality of depth data which are paired with the plurality of image data respectively; and
an image processing device, wherein the image processing device comprises:
one or more second processors; and
a second memory storing instructions which, when the instructions are executed by the one or more second processors, cause the image processing device to function as:
an acquisition unit configured to acquire the plurality of image data and the plurality of depth data corresponds to the plurality of image data respectively;
a calculating unit configured to calculate first position and attitude changes for each depth from the plurality of image data and the plurality of depth data;
a grouping unit configured to calculate a frequency distribution of depths corresponding to the first position and attitude changes from each of the plurality of depth data, and group the plurality of depth data in a plurality of groups based on the frequency distribution;
a detection unit configured to detect motions in the plurality of image data;
a region calculating unit configured to estimate regions, which have a same motion;
a processing unit configured to calculate second position and attitude changes of the regions for each motion; and
a determining unit configured to determine a position and attitude change of a whole image for the plurality of image data by determining a static region based on data of the first position and attitude changes which respectively correspond to the plurality of groups obtained by the grouping unit and data of the second position and attitude changes.

21. The imaging apparatus according to claim 20, wherein the instructions stored in the first memory cause the imaging apparatus to function as:
a correcting unit configured to perform image shake correction for the plurality of image data; and
a control unit configured to control the correcting unit by acquiring data of the position and attitude change of the whole image, which has been determined by the determining unit, and calculating an image shake correction amount.

22. A control method to be executed by an image processing device, the method comprising:
acquiring a plurality of image data and a plurality of depth data corresponding to the plurality of image data respectively;
calculating first position and attitude changes for each depth from the plurality of image data and the plurality of depth data;
calculating a frequency distribution of depths corresponding to the first position and attitude changes from each of the plurality of depth data;
grouping the plurality of depth data in a plurality of groups based on the frequency distribution;
detecting motions in the plurality of image data;
estimating regions, which have a same motion;
calculating second position and attitude changes of the regions for each motion; and
determining a position and attitude change of a whole image for the plurality of image data by determining a static region based on data of the first position and attitude changes which respectively correspond to the plurality of groups obtained in the grouping and data of the second position and attitude changes.

23. The control method according to claim 22, further comprising:
performing image shake correction using the data of the determined position and attitude change of the whole image.

24. A non-transitory storage medium on which is stored a program for causing a computer to execute a control method to be executed by an image processing device, the method comprising:
acquiring a plurality of image data and a plurality of depth data corresponds to the plurality of image data respectively;
calculating first position and attitude changes for each depth from the plurality of image data and the plurality of depth data;

calculating a frequency distribution of depths corresponding to the first position and attitude changes from each of the plurality of depth data;
grouping the plurality of depth data in a plurality of groups based on the frequency distribution;
detecting motions in the plurality of image data;
estimating regions, which have a same motion;
calculating second position and attitude changes of the regions for each motion; and
determining a position and attitude change of a whole image for the plurality of image data by determining a static region based on data of the first position and attitude changes which respectively correspond to the plurality of groups obtained in the grouping and data of the second position and attitude changes.

25. An imaging apparatus comprising:
one or more first processors;
a first memory storing instructions which, when the instructions are executed by the one or more first processors, cause the imaging apparatus to function as:
  a first input unit configured to input a plurality of image data of images imaged by an imaging optical system and an imaging element;
  a second input unit configured to input a plurality of depth data which are paired with the plurality of image data respectively; and
  an image processing device, wherein the image processing device comprises:
    one or more second processors; and
    a second memory storing instructions which, when the instructions are executed by the one or more second processors, cause the image processing device to function as:
      an acquisition unit configured to acquire the plurality of image data and the plurality of depth data corresponds to the plurality of image data respectively;
      a calculating unit configured to calculate first position and attitude changes for each depth from the plurality of image data and the plurality of depth data;
      a grouping unit configured to calculate a frequency distribution of depths corresponding to the first position and attitude changes from each of the plurality of depth data, and group the plurality of depth data in a plurality of groups based on the frequency distribution;
      a detection unit configured to detect motions in the plurality of image data;
      a region calculating unit configured to estimate regions, which have a same motion;
      a processing unit configured to calculate second position and attitude changes of the regions for each motion; and
      a determining unit configured to determine a position and attitude change of a whole image for the plurality of image data by determining a static region based on data of the first position and attitude changes which respectively correspond to the plurality of groups obtained by the grouping unit and data of the second position and attitude changes.

26. The imaging apparatus according to claim 25, wherein the instructions stored in the first memory cause the imaging apparatus to function as:
  a correcting unit configured to perform image shake correction for the plurality of image data; and
  a control unit configured to control the correcting unit by acquiring data of the position and attitude change of the whole image, which has been determined by the determining unit, and calculating an image shake correction amount.

* * * * *